(12) United States Patent
Macri et al.

(10) Patent No.: US 6,220,865 B1
(45) Date of Patent: Apr. 24, 2001

(54) INSTRUCTION FOR GROUPS OF USERS INTERACTIVELY CONTROLLING GROUPS OF IMAGES TO MAKE IDIOSYNCRATIC, SIMULATED, PHYSICAL MOVEMENTS

(75) Inventors: Vincent J. Macri, 5 Timber Brook La., Durham, NH (US) 03824; Paul Zilber, Plainview; Robert O. Magaw, Carle Pl., both of NY (US)

(73) Assignee: Vincent J. Macri, Durham, NH (US)

( * ) Notice: Subject to any disclaimer, the term of this patent is extended or adjusted under 35 U.S.C. 154(b) by 0 days.

(21) Appl. No.: 08/860,983

(22) PCT Filed: Jan. 22, 1996

(86) PCT No.: PCT/US96/00919
§ 371 Date: Oct. 6, 1997
§ 102(e) Date: Oct. 6, 1997

(87) PCT Pub. No.: WO96/22134
PCT Pub. Date: Jul. 25, 1996

(51) Int. Cl.[7] .................................................. A63B 69/00
(52) U.S. Cl. ..................... 434/247; 434/307 R; 434/365; 482/902; 473/446
(58) Field of Search ..................................... 434/247, 248, 434/251, 252, 256, 307 R, 308, 365; 482/900–902; 345/112, 114, 152, 156, 302, 473, 161, 163, 167, 173; 473/43, 152, 438, 446, 447, 453, 661; 273/317.1; 700/90–93; 463/1, 3, 4, 31, 35, 36

(56) References Cited

U.S. PATENT DOCUMENTS

| | | |
|---|---|---|
| 2,153,384 | 4/1939 | Mazza . |
| 3,408,750 | 11/1968 | McCollough et al. . |
| 4,337,049 | 6/1982 | Connelly . |
| 4,688,792 | 8/1987 | Rivkin . |
| 4,751,642 | 6/1988 | Silva et al. . |
| 4,752,764 | 6/1988 | Peterson et al. . |
| 4,805,631 | 2/1989 | Roi du Maroc, II . |
| 4,891,748 | 1/1990 | Mann . |
| 4,941,660 | 7/1990 | Winn et al. . |
| 5,174,759 | 12/1992 | Preston et al. . |
| 5,249,967 | 10/1993 | O'Leary et al. . |
| 5,363,297 | 11/1994 | Larson et al. . |
| 5,414,256 | 5/1995 | Gurner et al. . |
| 5,423,554 | 6/1995 | Davis . |
| 5,462,275 | 10/1995 | Lowe et al. . |
| 5,554,033 | 9/1996 | Bizzi et al. . |
| 5,643,094 | 7/1997 | Macri et al. . |
| 5,647,747 | 7/1997 | Macri et al. . |

FOREIGN PATENT DOCUMENTS

90/04848  5/1990  (WO) .

OTHER PUBLICATIONS

Okui, M., et al., "Locus Display Of Moving Sports Players," *SMPTE Journal*, 96(7):667–673, (Jul. 1987).

Primary Examiner—Joe H. Cheng

(57) ABSTRACT

A simulated training method in which groups of users interactively control user controllable images to make idiosyncratic, simulated physical movements. Preferred embodiments include user controllable images executing simulated physical movements in competition, opposition, coordination and sport activities. Means are provided to evaluate relative effectiveness of movements between groups of users.

7 Claims, 24 Drawing Sheets

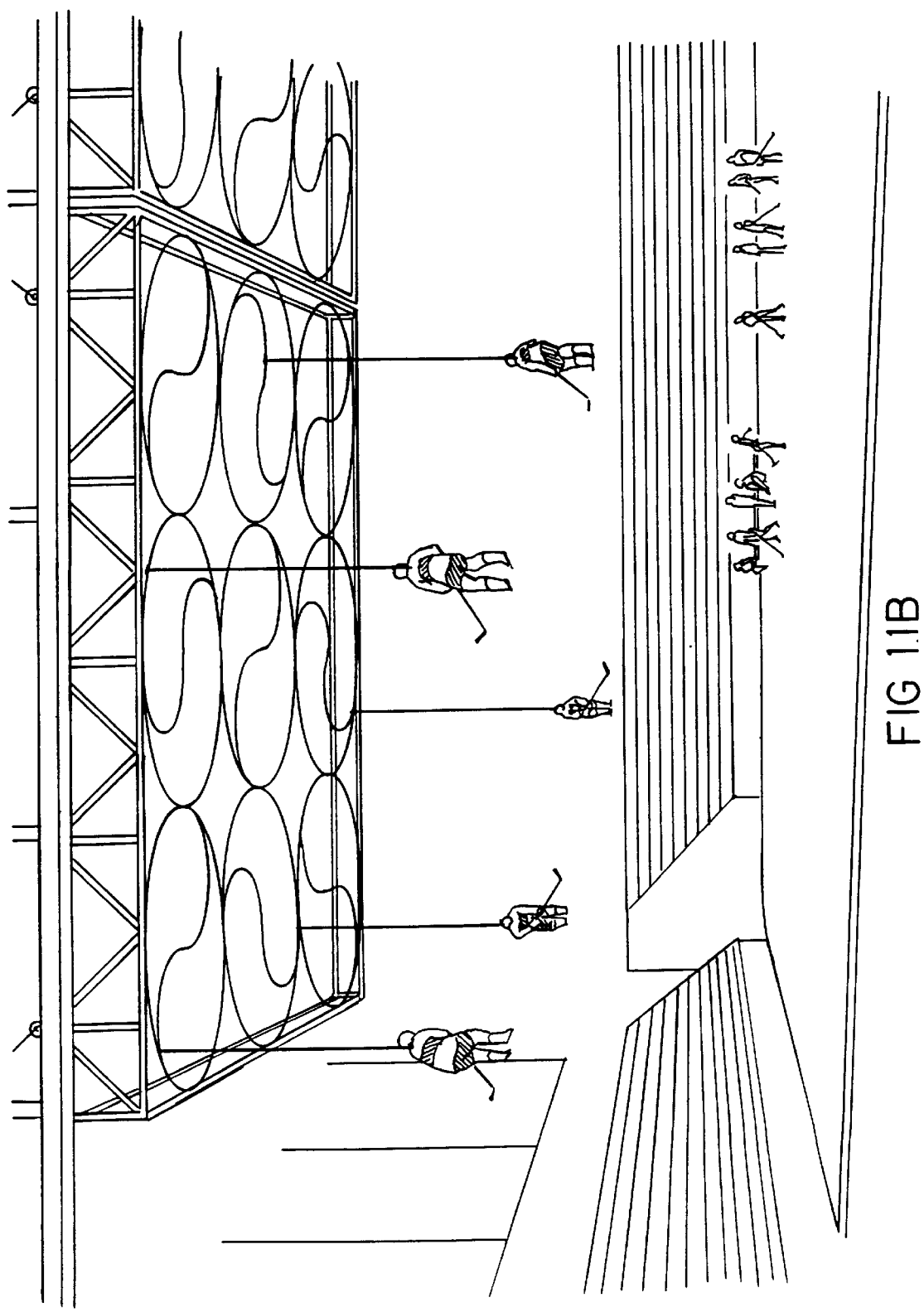
FIG 1.1B

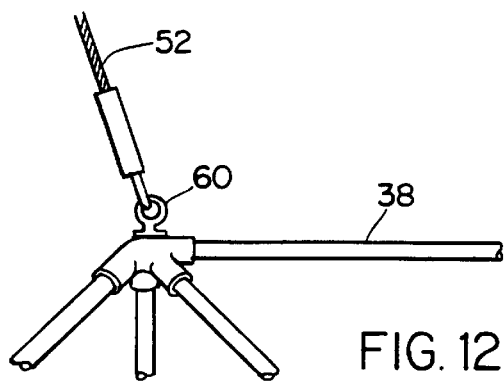
FIG. 12
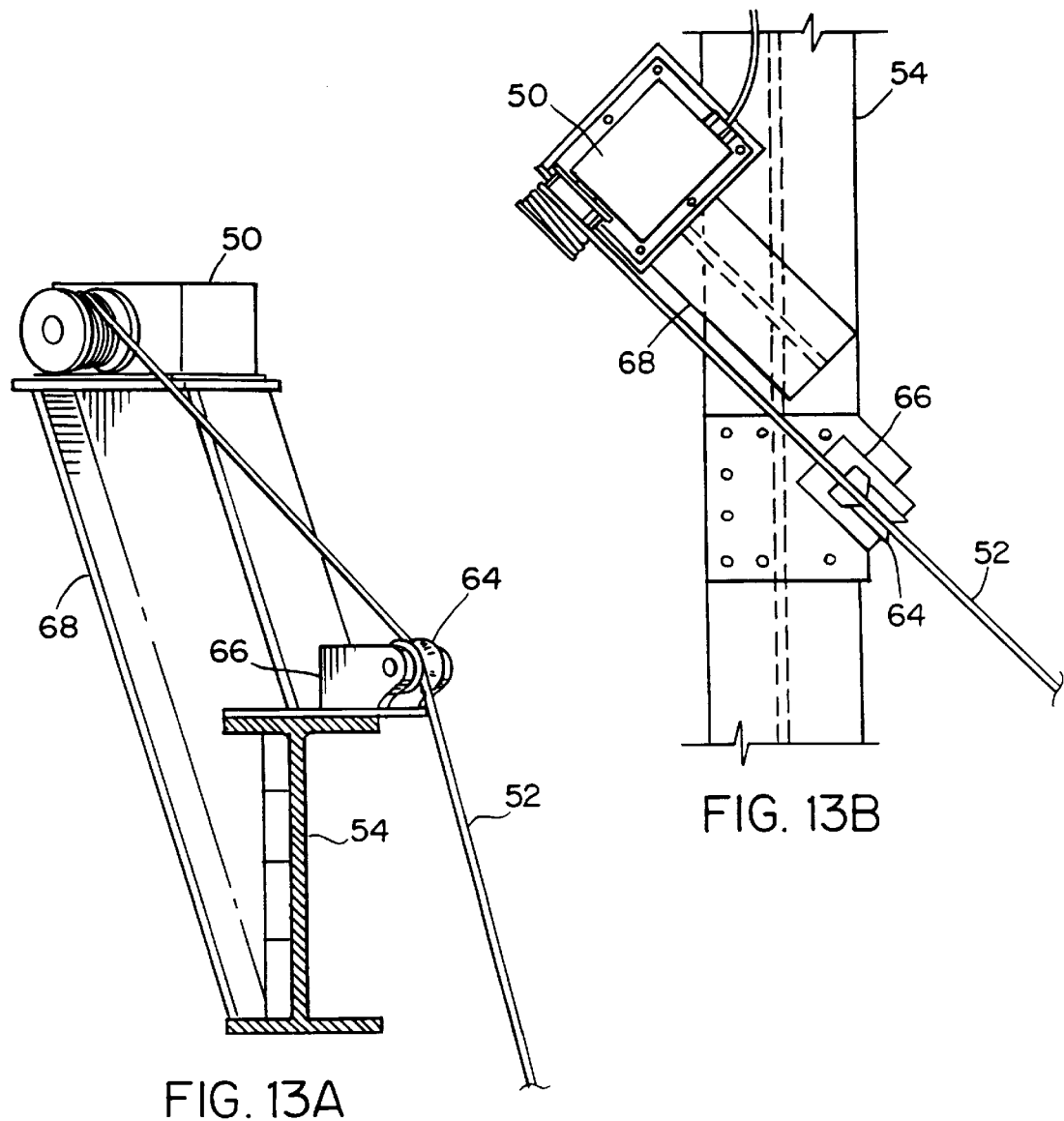
FIG. 13A
FIG. 13B

INSTRUCTION FOR GROUPS OF USERS INTERACTIVELY CONTROLLING GROUPS OF IMAGES TO MAKE IDIOSYNCRATIC, SIMULATED, PHYSICAL MOVEMENTS

This application is the U.S. National Phase of International Application No. PCT/US96/00919, filed on Jan. 22, 1996, which is a Continuation-in-Part of U.S. application Ser. No. 08/375, 606, filed Jan. 20, 1995, now U.S. Pat. No. 5,643,094, U.S. application Ser. No. 08/375,616, filed Jan. 20, 1995, now abandoned, and U.S. application Ser. No. 08/375,617 filed on Jan. 20, 1995, now U.S. Pat. No. 5,647,747, the teachings of which are herein incorporated in their entirety by reference.

BACKGROUND OF THE INVENTION (1) Field of the Invention

The present invention relates to instruction, training, coaching, practicing, acquiring fundamental skills and entertainment in the sports of ice and roller hockey.

(2) Description of the Prior Art

Ice and roller hockey are fast and dynamic sports. Each player's on-ice position constantly changes. Team and individual play continually alternates from offense to defense and back again, usually in a matter of seconds or fractions of seconds.

Hockey instruction usually begins with the demonstration or explanation of a skill, tactic, or maneuver by the instructor, followed by repetitious execution (practice) by players. Practice sessions typically include individual skill development and team preparation. Speed and power skating (explosive starts and stamina building) drills as well as stickhandling, passing, shooting, checking, and other individual aspects of the game are usually incorporated into practice sessions. Selected team plays are practiced as well; for example, plays which require constant repetition include those that originate in the face-off circles, those that develop while in offensive command of the puck, and/or those that occur while executing defensive maneuvers.

It is generally recognized that the amount of time spent practicing on the ice bears a strong relationship to the attainment of skills. However, it is also generally recognized that within most geographical areas there is a shortage of available ice time. There is on-going competition for ice time and therefore blocks of time for instructing, training and coaching is limited for many players and teams. In the struggle and scramble for quantitative ice time, attention to the optimal qualitative use of that time has been subordinated.

Currently, the objectives of ice hockey trainers, instructors and coaches are reached with few or no technological aids. For example, electromechanical devices for controlling on-ice playing variables and repeating specific conditions, so that individual skills and team play can be enhanced, is virtually nonexistent. Similarly, electronic measuring devices and computer assisted (or interactive computer "games") technology for training, coaching or entertainment are virtually nonexistent. Devices currently used for instruction/practice in ice hockey include:

(1) nylon parachutes pulled by the skater(s) (used to increase drag, and therefore, the skater's leg strength by overcoming the drag), (2) surgical tubing attached to a harness on the skater's shoulders and, at the lowest point, to the skates causing the skater to bend at the knees and waist while skating (a preferred skating position for ice and roller hockey), (3) lengths of wooden boards (or hockey sticks) placed on the ice for practicing jumps and other skating maneuvers, and (4) orange plastic traffic cones, used as pathmarkers for skating drills.

Devices (1) and (2) mentioned above are designed to increase players' strength and form but do not provide instruction/practice in the skills, moves and maneuvers which are particular to ice and roller hockey. Devices (3) and (4) described above can be used to practice skating maneuvers in hockey but suffer from their placement on the surface of the ice because the skater is forced to pay undue attention to the surface of the ice.

It has been difficult to provide players with precise conditions that would allow them to emulate ideal maneuvers or to practice against an ideal opposing player or team. The problem is controlling the variables. In existing practice sessions a player usually practices opposite the instructor or other players. Since every "opposing" player or instructor is prone to human error or simply fatigue, maneuvers and skills cannot be repeated in a desired optimal fashion. This process inhibits players from practicing a desired maneuver until it is perfected: it lengthens the learning process and "loses" many players except for the truly motivated. Players may learn "bad habits" while playing opposite a less than carefully structured opponent or by emulating a less than proficient example. Instructors, trainers and coaches face a daunting challenge, which is to control, in a time-effective manner, the conditions (variables) on ice, so as to achieve enhanced individual skills and team play.

In the field of computer or video games these products are for entertainment and diversion rather than for instruction, cogr.tion, and mental drill in how to acquire the skills to play the sport. The basic principles and skills necessary to train for and to play hockey are not taught by these video or computer games.

In the computer or video games, the game player's skill is essentially to master the programmer's game. Accordingly, the game player needn't know anything about hockey other than the fact that goals are scored by pucks entering the goal net. Video game players learn little about how to execute any of the hundreds of skills essential to ice hockey, nor will they acquire practice in the realities of playing ice hockey, including individual or team positional and situational play for either offensive or defensive situations.

None of the prior devices or methods noted above provide the student with cognitive information concerning principles, tactics, maneuvers, and skills used in playing ice hockey. In addition, these devices do not enable the player to receive quantitative feedback concerning his/her progress in mastering the cognitive aspects of the sport and/or biomechanical or physiological measures.

SUMMARY OF THE INVENTION

The need to use ice time qualitatively and time-effectively on a technologically enhanced ice rink is addressed by this application. One aspect of the invention comprises a rink of standard or other size including a playing or skating surface. Like any typical skating rink, the rink of the invention can also include markings typically employed in a hockey rink to enable the playing of hockey on the skating surface, goal nets on the skating surface, penalty boxes adjacent to the skating surface and seating for spectators. The invention further comprises means for enhanced instruction and/or entertainment in the sport of hockey including electronic and other sensing and monitoring devices for monitoring play on the skating surface and physical conditions of the players. The devices include, but are not limited to, a network of video cameras and magic eye recorders used to measure speed and accuracy and to obtain visual records of training sessions. These records may be used for performance feedback before, during and after instructive training or coaching sessions. The devices for monitoring play and practice and providing feedback can also include devices for monitoring players' physical condition including one or more sphygmomanometers for measuring blood pressure, pulsoximeters for measuring the percentage of oxygen saturation in blood and for measuring heart rate, thermometers for measuring body temperature and muscle activity, electrocardiograms to measure stress, heart rhythm and recovery rates, timing devices to measure pulse and respiration, myoglobin measurements to measure muscle breakdown, electroencephalograms to measure brain functions related to athletic games, training and practicing and other devices.

The means for enhanced instruction can also include one or more mechanized electromechanical robots preferably in human form and, in one embodiment, suspended from an overhead support structure which includes one or more movable tracks. The robots are outfitted and designed to simulate hockey players and to move along the overhead tracks in a manner which simulates actual plays and maneuvers used in the sport of ice hockey. The robots are equipped with electronic sensors such as impact sensors that enable performance measurements to be obtained during training sessions with players.

Data obtained by the sensors in the robots and by the other monitoring devices can be transmitted to receivers, a processor/computer and/or computer-based terminals in a training area. The training area can include one or more rooms adjacent to the skating surface with one or more transparent walls facing the skating surface.

With regard to stickhandling, passing, shooting and positional play, the robots can be used to measure accuracy by recording the number of times the robots are hit by pucks or players during stickhandling, passing or shooting exercises. Such measurements provide an indication as to how much of an obstruction the robots are to the player. Using video tapes or other means of recording the action, an assessment as to how well a player is positioned relative to the location of one or more of the robots can be made. With regard to checking and contesting for control of the puck, the robots can measure impact and/or the force of contact.

The invention is also directed to the one or more mechanized electromechanical robots in human form outfitted to resemble hockey players. Use of these robotic aides increases the players' on-ice skills and abilities. The robotic training devices are designed to simulate actual conditions and to provide increased levels of complexity and challenge in the skills, maneuvers and plays that must be practiced in order to play ice hockey. The computer in the training area is preferably coupled to the robots to control and monitor them to enable instructors and/or players to preselect formations, movements, elevation and speed. Precise and timely feedback on the results of individual and team performance can be provided to the computer and to hockey teachers and coaches.

Each robot is designed to contain a series of sensors capable of transmitting information on each player's performance to the training computer. The training computer evaluates the data received from each robot and provides real-time feedback which can be used to evaluate individual and group performance. Feedback is obtained from the sensing devices within the robots. This data (or the absence thereof, e.g., the execution of a drill without touching the robot) is transmitted to the computer and can be used in conjunction with images obtained by video recorder or other recording and/or monitoring device.

In one embodiment, the robots are suspended above the skating surface of the rink by a support structure having at least one track assembly. Each robot is coupled to the track assembly by a motorized car which runs inside the track of the track assembly. The computer transmits commands to the robot and/or the motorized car to control movement of the robots along any of a variety of courses designed to simulate path patterns followed during hockey games. The robot and/or motorized car can include a processor and associated circuitry which receives and decodes the commands from the computer to move the robots along the commanded path.

The invention also includes an interactive system and method used by instructors, coaches, rink management personnel and/or players to control and monitor the activities in the rink. The processing system includes a database capability for storing data regarding players, teams, rink maintenance and use schedules, etc. The system also allows the user to control activities taking place on the rink and the monitoring thereof. The user can use the processing system to select desired feedback data from particular sensors.

The processing system can also be used to control use of the mechanized robots in practice or play exercises. The user can interact with the system to plan a particular exercise and then to control its execution. While the exercise is being executed, the user can further interact with the system to control the monitoring of the exercise by selecting particular sensor data items for display, recording and/or other processing.

Interaction with the processing system by the user can be accomplished by a variety of different means. These can include user input via keyboard, mouse or other input device and output via a computer system display or printer. In addition, feedback to the user can be in the form of virtual reality output from the computer. In this embodiment, the user can wear a virtual reality helmet to receive sensor feedback from the sensors and other sensors. In addition, input can be provided to the system by the user wearing a virtual reality glove and by the virtual reality helmet.

During execution of an exercise, the processing system transmits commands to the robots. In the case in which the robots are supported by the overhead track assembly, a signal and control bus is connected from the processing system along the tracks to the robots. The signal and control bus can also be connected to the motorized cars that control movement of the robots. The bus can be a bi-directional communication bus such as an ethernet or other serial or parallel communication system. Sensor data indications gathered by the robots are transmitted from the robots to the processing system either over the serial bus or by separate signal lines.

The motorized car and/or the robot include a processor and associated circuitry which receive the commands for movement from the processing system executing the exercise. In the case where the robots receive the commands, the commands are typically received and decoded by the processor internal to the robot and then reformatted and transmitted to the motorized car to command movement. The communication link between the robot and the motorized car in this case can also be a standard serial or parallel communication link. In this case, the processor in the car receives and decodes the commands and moves the car accordingly along the track assembly to move the robot. Alternatively, the command signals to move the car can come directly from the robot itself based on the decoded command from the processing syste.. Alternatively, movement commands can be transmitted along the bus from the computer processing system directly to the motorized car.

The motion commands from the processing system typically command the robot to move to a different location along the skating surface or command a portion of the robot, such as an arm or a leg, to move or a combination of both movements. The robot contains all the electronic circuitry such as electrical motors, solenoids, relays, etc., required for movement of arms, legs, head, etc. The processor internal to the robot decodes commands for movement of a portion of the robot and sends the appropriate signals to the appropriate circuits to implement the commanded movement. Movement along the surface of the ice involves commands sent to the motorized car from either the processing system or the associated robot. The motors drive the wheels of the car in response to the commands. Speed and/or position sensors in each of the cars provide feedback used by the processing system or robot processor to control execution of the movement. Commands from the processing system control movement of both the car and the track assembly itself such that movement of a robot from one position to another can be precisely controlled and monitored.

In one embodiment, power is also supplied to the robots and motorized car via the track assembly. A separate power source such as the power company service drop to the rink or a separate generator is connected to the robot and motorized car by a power distribution network. In another embodiment, robot and car power are provided by a battery inside the robot.

In an alternative embodiment, the robots are not supported by an overhead support assembly. Instead, the robots move along the skating surface on sets of wheels or wheeled tracks. In this embodiment, each robot can preferably contain its own power source in the form of a battery. Propulsion can be provided to the robot by the battery in conjunction with electric motors and/or by an internal combustion engine inside the robots. The processing system can preferably transmit commands to the robots by RF, infrared or other link. Each robot includes a compatible receiver and processor which receive and decode the commands to control movement of the robot. Alternatively, a memory inside each robot can store a series of preset commands used by the internal processor to control execution of a preselected routine.

The invention enables players to learn and to practice in realistic conditions and to repeat moves and drills needed to master the maneuvers, tactics and plays essential to ice hockey. Players can also develop skills in the main physical/athletic components of ice hockey, including (1) agility, (2) balance, (3) form, (4) impact, (5) speed, (6) strength, and (7) timing.

The present invention also provides a computer-based system for tutorial and interactive instruction in the sport of ice (or roller) hockey including, but not limited to, the principal activities of skating, stickhandling, shooting, checking and offensive and defensive play. Means are also provided for participation in simulated hockey situational plays and games. The system of the present invention is particularly well suited for use as a self-study or directed study aide and as a primer for performing the maneuvers, skills, and tactics used in offensive and defensive play. The system is also particularly well suited for use by instructors, trainers, and coaches at any level of expertise and for entertainment purposes.

Playing ice hockey (or roller hockey) can be hazardous. As with other hazardous endeavors, the practice of simulated action or the emulation of ideal action before actual execution is advisable. The use of computer assisted technology to enhance the amount of practice and simulation time should be distinctly advantageous to the user's (the player/student's) knowledge base. Unlike video and arcade games, which do not enable the game player to initiate or react to the real dynamics of the game, the present invention requires the player/student to cause the movement of an adopted image in the form of a hockey player. The present invention relates to real time interaction rather than mediated interaction. Whereas video, arcade, and computer games are characterized by constrictive learning, the present invention is the opposite, permitting constructive learning through individual control and relevant feedback. Feedback enhances the player/student's interest in the game and increases his/her zone of learning and assimilation.

In the present invention the player/student is involved with hands-on, head-in activity, making decisions and causing actual change. This type of control and initiative and the relevancy and accuracy of the feedback will lead to a richer (robust) learning experience. Accordingly, the present invention will also relate to a variety of sub-components of the basic principles of ice and roller hockey including, but not limited to, agility, balance, impact/contact, timing, and "read-and-react" skills.

The computer software system of the present invention enables the player/student to see and hear on a computer display screen or other device how a particular skating, stickhandling, checking or other skill should be performed (the "ideal" pattern) by the player/student by observing an ideal or "master" image of the skill being performed. The player/student may then interact with the system by actually causing an on-screen adopted player to perform the skill while viewing his/her individual performance in comparison to the ideal pattern (visible as a real time feedback guide). The player/student will most likely be an active or prospective ice hockey player however, since feedback will occur in real time and since proficiency scores will be posted on screen at the end of each drill, the tutorial or interactive game may be played by anyone. It will also be obvious to anyone skilled in the art that feedback can be delayed and/or printed out in hard copy.

For each skill or tactic, the computer software system of the present invention provides an animated or digitized image of a player (or players) who performs the "ideal" execution of the skill or tactic. The ideal performance can be accompanied by written and/or auditory tutorials and it can be played in slow motion, at regular speed or at faster than human speed. For some purposes the lesson can end at that point. For most purposes an interactive instruction follows.

The interactive session calls upon the player/student to cause his/her adopted animated or digitized player to execute maneuvers under the direction of the player/student. The present invention can use the ideal skater as is or can transform an animated or digitized ideal skater into an anatomical outline and provide that the outline have superimposed upon it or set beside it an "adopted" silhouetted figure which moves at the direction of the player/student. This calls upon the player/student to understand the physical movements that are required by the maneuver and to strive to have his/her adopted player make those movements.

The user interacts with the computer system via input/output devices which can include a mouse and/or keyboard with a display and/or printer. Also, virtual reality devices can be used to interact with the user. A virtual reality glove and helmet can be worn by the user to provide a complete user-interactive interface.

Since this interactive exercise is performed by pitting the adopted player against the "ideal" player's execution, the difference between player/student effort and ideal execution can be measured. Auditory and/or written prompts are given in real time as well as a score registered at the end of the exercise. For any given skating step, stride or maneuver, the player/student will have positive or negative feedback in both audio and visual form based on his/her ability to emulate the drill being displayed. Advancements to the next higher level or repetition for correction are integral parts of the invention.

The applications of such instruction are numerous. Player/students using the invention learn at the computer what they will be called upon later to do on the ice. The opportunity for self-drill and repetition is excellent. Mental preparedness can be enhanced. Uniformity and economy.in coaching and instruction can be enhanced. A lesson can be designed in advance, as can game plans. Computer usage and literacy can be a learned by-product. Certain principles of geometry and physics can be learned in conjunction with understanding how efficient and effective execution of skills leads to enhanced results. For example, how tighter turns shorten the distance between present and desired positions on the ice or how good balance, timing and form lead to increased skating speed and strength.

Benefits of the present invention include the opportunity to visualize an "ideal" image of specific skills and maneuvers used in ice hockey. The player/student can see how the skill or play should be executed as a dynamic whole (either in slow motion or actual speed) or to pick apart the skill or play by viewing images frame by frame. The latter method enables the student to see details of the ideal maneuver which might not be apparent in a moving image.

Using the invention, the player/student is able to learn each skill at his/her own pace. Since images can be moved frame by frame and repeated as many times as desired, the player/student can perfect his/her understanding and performance of each skill. Repeating each maneuver improves recollection of what has been learned.

Using the invention, feedback is received in real time by the player/student as he/she is able to see on the computer screen how closely the adopted image emulates the ideal image. In addition, the invention provides a means to numerically evaluate the player/student's ability to match the movements and maneuvers of the ideal image. The quantitative evaluation makes it possible for the student to monitor his/her progress in performing the skill, play or tactic each time it is practiced.

Benefits to instructors include consistency and objectivity in the information given to each player/student. Each player/student receives the same information and is able to repeat the exercise until the skill is learned. Since player/students are able to use the present invention independently, staff time can be quantitatively and qualitatively enhanced. Instructors and students can select areas for more or less concentration and actual practice. Use of the present invention is also of benefit if access to ice hockey rinks is limited or, conversely, more can be made of abundant ice time.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 11B is a perspective view of the robots and support structure in the raised position.

FIG. 12 is a schematic side view of a suspension cable connection to the support structure of the present invention.

FIG. 13A is a schematic elevational view of a suspension cable of the invention fed through a guide pulley and hoist motor.

FIG. 13B is a schematic plan view of the suspension cable, guide pully and hoist motor of FIG. 13A.

DETAILED DESCRIPTION OF THE INVENTION

Figure 1:
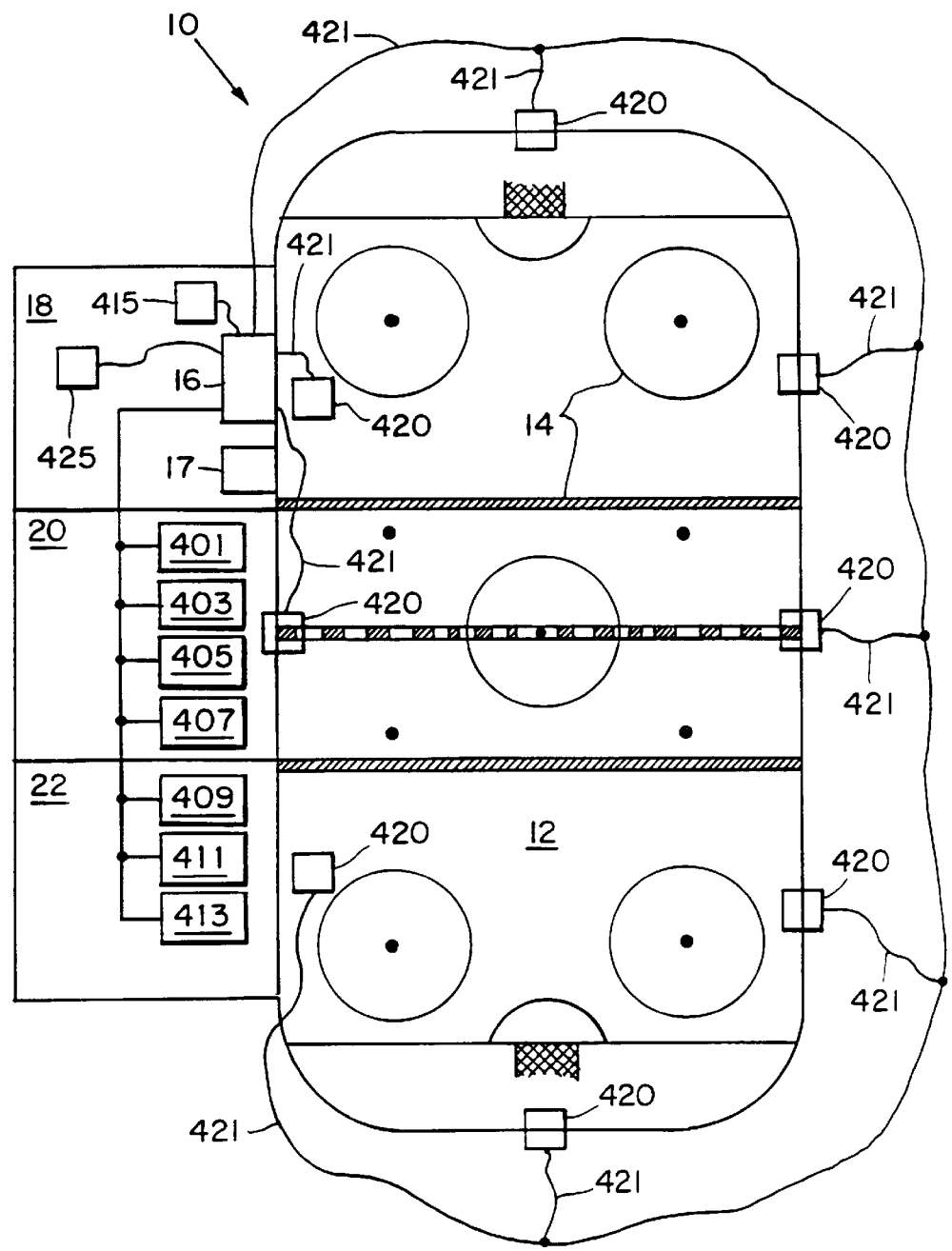
FIG. 1 is a schematic plan view of a rink and adjoining rooms in accordance with the present invention.

Referring to FIG. 1, a preferred embodiment of the present invention comprises a hockey rink 10 including a skating surface 12 used for instruction, practice and play in the sport of ice hockey. The rink 10 may include markings 14 similar to those in a standard hockey rink. A plurality of rooms, three rooms 18, 20, 22 in one embodiment, approximately 45 feet by 45 feet in size, adjacent to the skating surface 12, can be used for control and monitoring computers 16, video recorder and replay equipment 17, and game planning. The computer/processing system 16 can be a personal computer or UNIX-based system or other processing system used to control operations and data storage for the rink facility 10 and to receive reports from various sensing, monitoring and/or recording devices in the rink facility 10 and to present such indications in the form of display on the system.

Interaction between the computer system 16 and the user is made by input/output devices 415. The input/output devices 415 can include a keyboard, a mouse or other input device for providing user input and a display and/or printer for providing output. Alternatively, interaction with the system 16 is provided by virtual reality devices. The devices 415 can include a virtual reality glove and helmet worn by the user for providing input and virtual reality displays.

Any of the adjacent rooms 18, 20, 22 can also contain other measuring devices which can be used to monitor and/or measure and feed back information on athletic, biomechanical and physiological functioning of one or more of the player/students. The other devices can include one or more of the following: 1) Sphygmomanometers 401 for measuring player/student blood pressure, 2) pulsoximeters 403 for measuring the percentage of oxygen saturation in blood and for measuring heart rate, 3) thermometers 405 for measuring body temperature and muscle activity, 4) electrocardiograms for measuring stress, heart rhythm and recovery rates, 5) timing devices 409 for measuring pulse and respiration, 6) myoglobin measuring devices 411 for measuring muscle breakdown, and 7) electroencephalograms 413 to measure brain functions related to athletics.

Each of these devices can be used to generate data indicative of the measurement it obtains. The data is either generated by the device itself and then forwarded over a bus to the computer 16, or it is obtained manually by a technician and then provided to the computer manually as data input via the input device 415 such as a keyboard or mouse. In FIG. 1, the devices are shown located in different rooms and connected to the computer 16, which is located in a third separate room. It will be appreciated that tills configuration is not critical to the invention. All of the devices can be located in the same room as the computer, or any combination of rooms and equipment can be used.

The rink 10 is also equipped with a plurality of video recording devices, "magic eye" detectors and sound recording equipment, collectively referred to by reference numeral 420. Although referred to together, they need not be installed as such. Any or all of the devices can preferably be mounted in a desired predetermined configuration to appropriately sense and record practice and training sessions. For example, video recorders can be placed at surface level, at the top of the hockey boards and overhead to provide a complete recorded visual image of a practice session. Magic eye recorders, which are preferably infrared detectors which indicate detections as players pass through their field of view, can also be located at varying heights and spaced apart at varying distances to allow accurate determination of player skating speed. Sound recording devices can also be placed at various positions around the rink 10.

The devices 420 are all preferably connected to the computer 16 via cables 421. The cables transfer signals from the devices 420 that are indicative of the measurements and detections they obtain. The computer receives all of the detections and processes the data, for example, by computing the speed of a skater using times of magic eye detections. The reported detections from all of the devices 401, 403, 405, 407, 409, 411, 413 and 420 can then be presented individually or in any desired combination on the computer display 425.

The format of training or practicing sessions is improved by practicing the invention in that the measuring devices can produce quantitative information for the benefit of players, coaches and instructors. Following data acquisition from the devices by the computer, analysis of data follows the establishment of standards set by medical professionals, trainers and others. The computer output of information in effect represents an interpretation of what the raw data input represents with respect to the pre-established standards or individual prior performance or ideal performance. Beneficial change, redirection or emphasis of athletic activity can be based on the computer information. The athletes' interaction with all such devices and data in the enhanced rink setting can lead to qualitative and time-effective improvements.

Figure 2A:
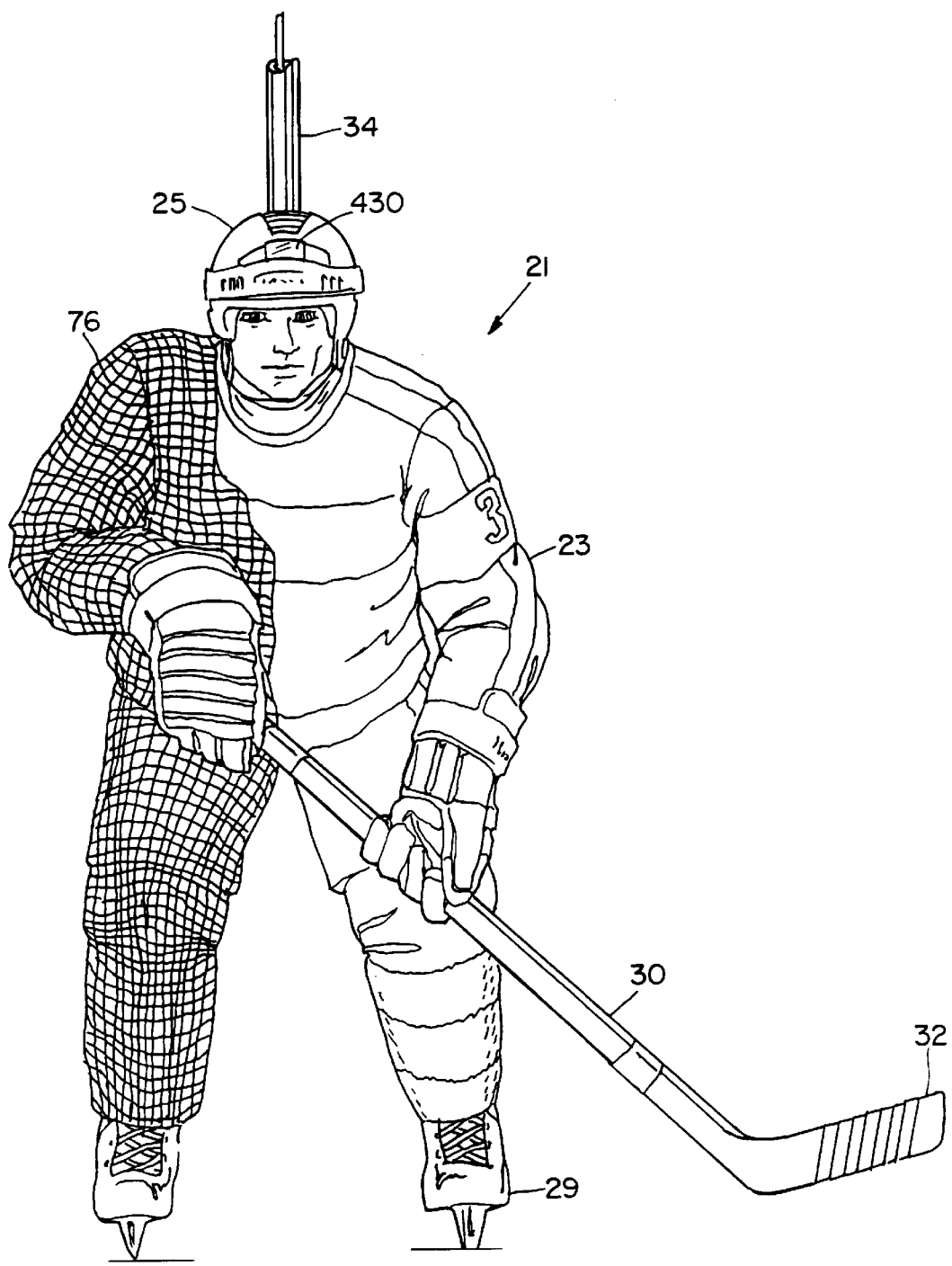
FIG. 2A is a schematic front view of an embodiment of a mechanized robot according to the present invention.
Figure 2B:
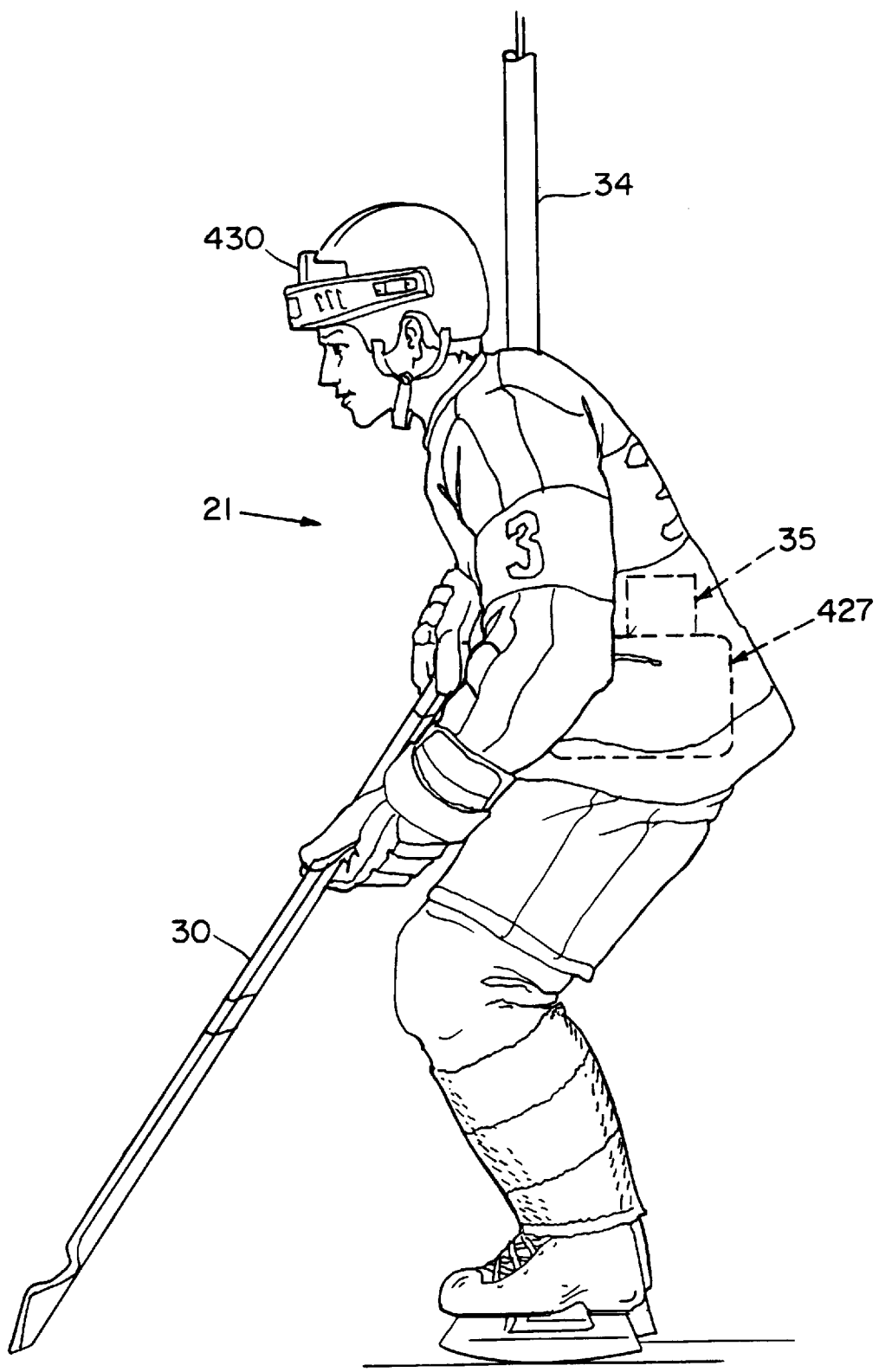
FIG. 2B is a schematic side view of the mechanized robot of FIG. 2A.

Referring to FIGS. 2A and 2B, the invention further comprises facilities for instruction and/or entertainment in hockey including one or more mechanized electromechanical robots 21 preferably in human form and preferably outfitted to resemble hockey players. FIG. 2A is a front view and FIG. 2B shows a side view of one of the robots. For each of the athletic and physical abilities that should be mastered by an aspiring hockey player, the robots 21 serve as sensing, obstructing, resisting, measuring and recording devices.

The robots 21 wear uniforms 23 designed to resemble those currently used in the sport or, alternatively, special colors to indicate particular formations or desired movements for instruction and practice purposes (for example, solid black for robots "playing" defense, solid yellow for robots "playing" offense). Human features can be added to the face, which is the only exposed area on the robots.

The robots 21 can be built in any of several sizes. One larger size is approximately 72 inches high, from the top of the helmet 25 to the bottom of the skate 29, and 30 inches wide from shoulder to shoulder. A size for younger players can be 30% or 16.6% smaller or some other appropriate size.

Each robot 21 holds a hockey stick 30, either right or left handed, which can be adjusted to any stationary vertical position or programmed to move vertically so that the blade 32 of the stick 30 at its lowest point is about ¼ inch above the ice to 50 inches above the ice at its highest point. The robots 21 can also include a video recorder 430 which can be mounted in the helmet 25 to record practice sessions from the perspective of the robot 21.

Each robot 21 is covered with high-impact padding fitted over an armature or frame made of a plastic, metal or carbon/graphite composition material. These materials are used for the armature in a preferred embodiment of the invention because of their strength, resilience, and impact resistance. In alternative forms of the invention the armature may be made of combinations of metal, metal alloys,.or a composite material similar to that currently used in some hockey sticks. The high-impact padding can be made of any number of commercially available materials such as urethane foams. This material is frequently used in athletic equipment to prevent injury and will retain its shape after impact. The robots 21 can also include a ballast material 427 such as water or sand to add weight to the robots 21 as desired for stability or impact resistance.

Each robot 21 preferably also includes a processor 35 and associated circuitry which are used to control the robot 21.

Commands from the processing system 16 are communicated to the processor 35 in the robot 21 via a communication link commonly used to permit communication among processors, such as a standard parallel or serial link, such as an Ethernet link. Commands received by the processor 35 are translated into control signals used to control motors, solenoids, relays and other electronic devices within the robot. The devices effect movement of portions of the robot, such as arms, legs, etc., as commanded by the processing system 16.

Figure 3:
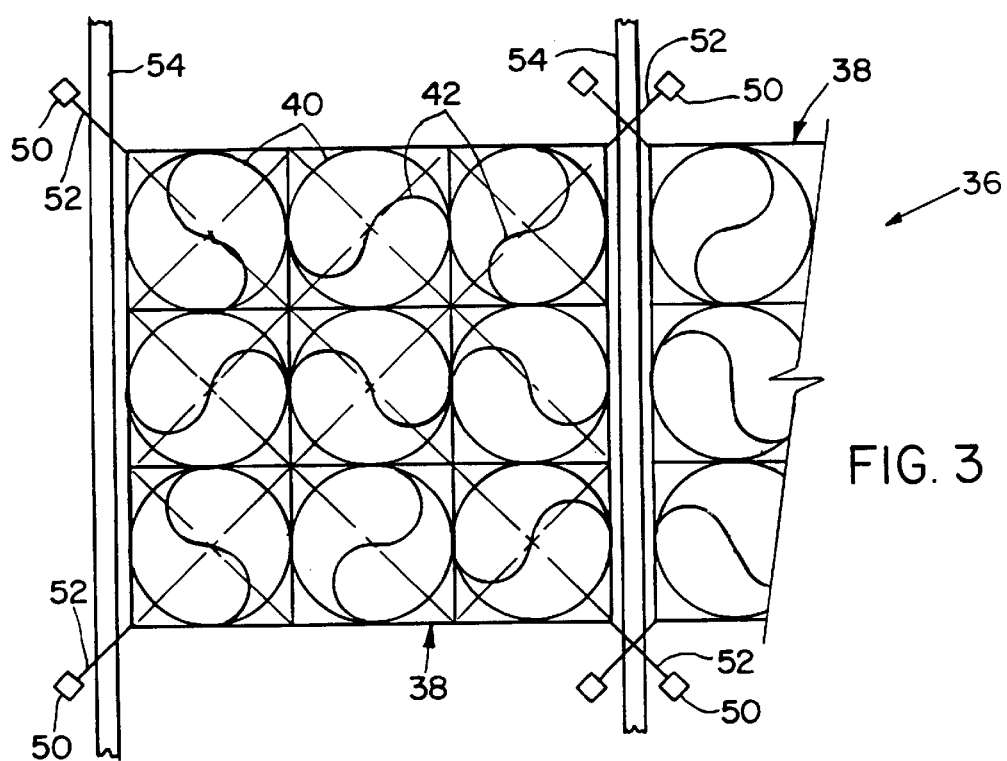
FIG. 3 is a schematic plan view of a track assembly from which the robots are suspended including the hoist point locations in accordance with the present invention.

Robots 21 are suspended approximately ¼ inch above the surface of the skating surface 12 from 2-inch diameter stainless-steel suspension tubes 34 attached to an overhead support structure 36 comprising one or more track assemblies 38 (see FIG. 3) which are in turn connected to the frame 54 of the building that encloses the rink 10. Referring to FIG. 3, which is a schematic plan view of a track assembly 38, each track assembly 38 is supported by preferably four steel cables 52 connected between the track assembly 38 and four hoist motors 50 used to raise and lower the track assembly 38 as described below.

Each overhead track assembly 38 of the support structure 36 is laid out in a series of connected circles 40 containing figure "S"s 42 that enable the robots 21 to move on.any number of different simulated skating paths or patterns typically followed during hockey play. The circles 40 can be manufactured so that they rotate within the track assembly 38 in response to commands from the processing system 16, thus enabling an increased number of paths which the robots 21 may follow. With the computer 16 controlling rotation of the circles 40 simultaneous with movement of the robots 21 along the "S"s, a virtually infinite number of movement patterns can be realized. As described below in detail in connection with FIGS. 9A–9F, the particular path followed by the robots 21 is controlled by a program running on the computer 16 that enables the instructor or player to plan specific drills, formations and plays for practice sessions.

The size of the ice rink 10 determines the number of track assemblies 38 which can be built into the facility. Each track assembly 38 is approximately 24 square feet and can contain from one to nine circles 40 and, hence, mechanized robots 21. Larger rink facilities may contain more than one track assembly 38, each containing from one to nine robot players. This design enables rink facilities to be used by more than one team at a time, and thus increase ice time for ice hockey players. In addition, smaller facilities with fewer track assemblies 38 may be built where resources are limited or when it is advantageous to have fewer players on the ice.

Figure 4:
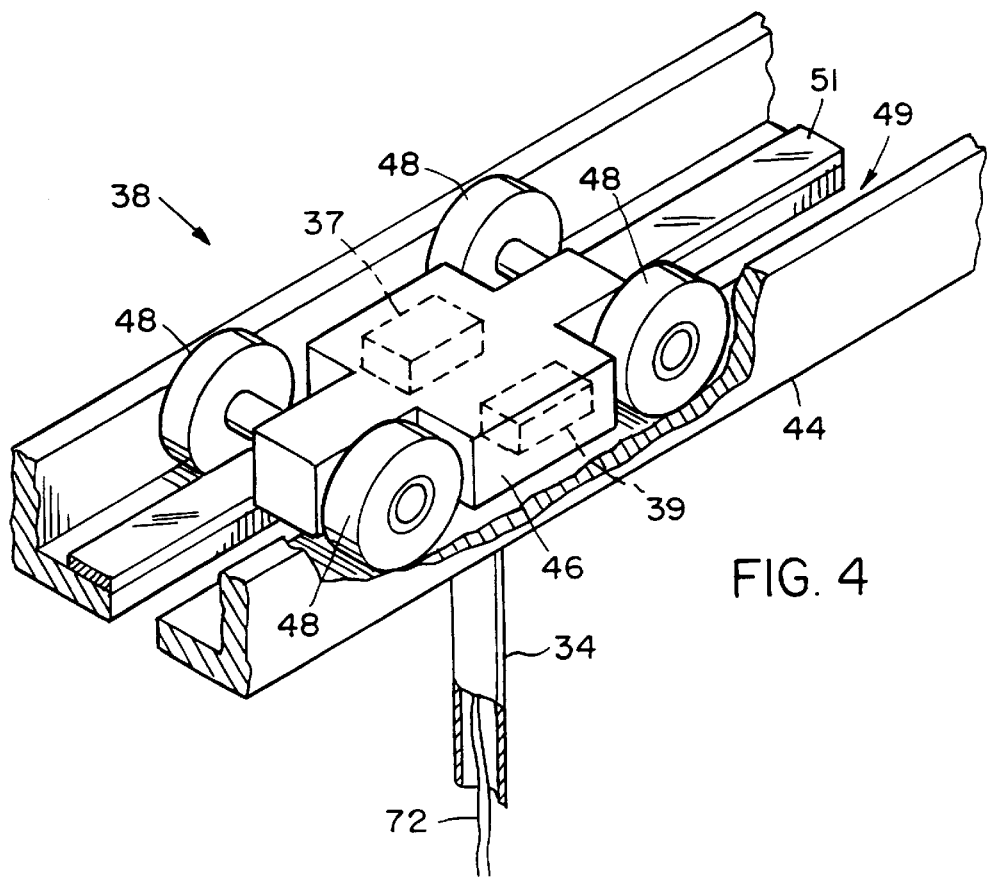
FIG. 4 is a perspective illustration of a motorized car which runs inside the track assembly of the present invention.

Referring to FIG. 4, the motoring device that moves the robots is preferably a direct current motor that powers a motorized car 46 which runs on a track 44 in the track assembly 38. A conductive material inside the tracks 44 can be made of copper or a copper alloy. The motor is encased in the wheeled car 46 which moves on wheels 48 inside the track 44. The body of the car 46 can be cast or formed from a durable material such as iron. In one embodiment, two wheels of the car are designed to conduct electricity to provide power and control signals to the car. In the preferred embodiment of the invention, these wheels are made of copper rods. The remaining two wheels are rubberized.

The power, control and data signals to and from the computer 16 and processor 35 are carried along the signal bus 51 in the bottom of the track 44 and are picked up by the conductive wheels. Alternatively, a brush contact can be made between the car 46 and the bus 51. Signals are carried to and from the robot 21 along a cable 72 inside the suspension tube 34.

In one embodiment, the car 46 includes a processor 37 and associated circuitry used to provide communications via the bus 51 and cable 72 with both the computer 16 and processor 35 in the robot 21. Commands received from either the computer 16 or processor 35 to move the car 46, and hence the attached robot 21, are decoded and translated into motor control signals by the processor 37. A velocity sensor 39 in the car 46 detects the velocity of the car 46 relative to the track 44 and provides velocity feedback to the computer 16, processor 35 and/or processor 37 such that speed and position of the robot 21 can be precisely controlled. Alternatively, or additionally, a potentiometer can be used to control the speed at which the car 46 moves along the track 44. Increases and decreases in the voltage fed to the potentiometer allow the robots to increase or decrease speed during maneuvers.

Each robot 21 is coupled to the motorized car 46 by the suspension tube 34. The suspension tube 34 runs from the helmet 25 of a robot 21 (see FIG. 2A), through an opening 50 in the track 44 to the bottom of the motorized car 46. As the car is controlled to move along the track 44, the robot 21 is moved in a pattern over the skating surface 12. The pattern and speed of movement are controlled by signals from the system computer.

The formations and drills executed by the robots are selected by the instructor or coach from a computerized menu. The instructor can choose to repeat specific maneuvers or vary the drills executed in the practice session. In addition, since the robots perform according to preprogrammed patterns, they are able to precisely repeat plays and individual maneuvers (straightforward or difficult) each time they are activated. This assists players interacting with the robots to improve skills and to avoid bad habits as they progress in the sport.

Figure 5A:
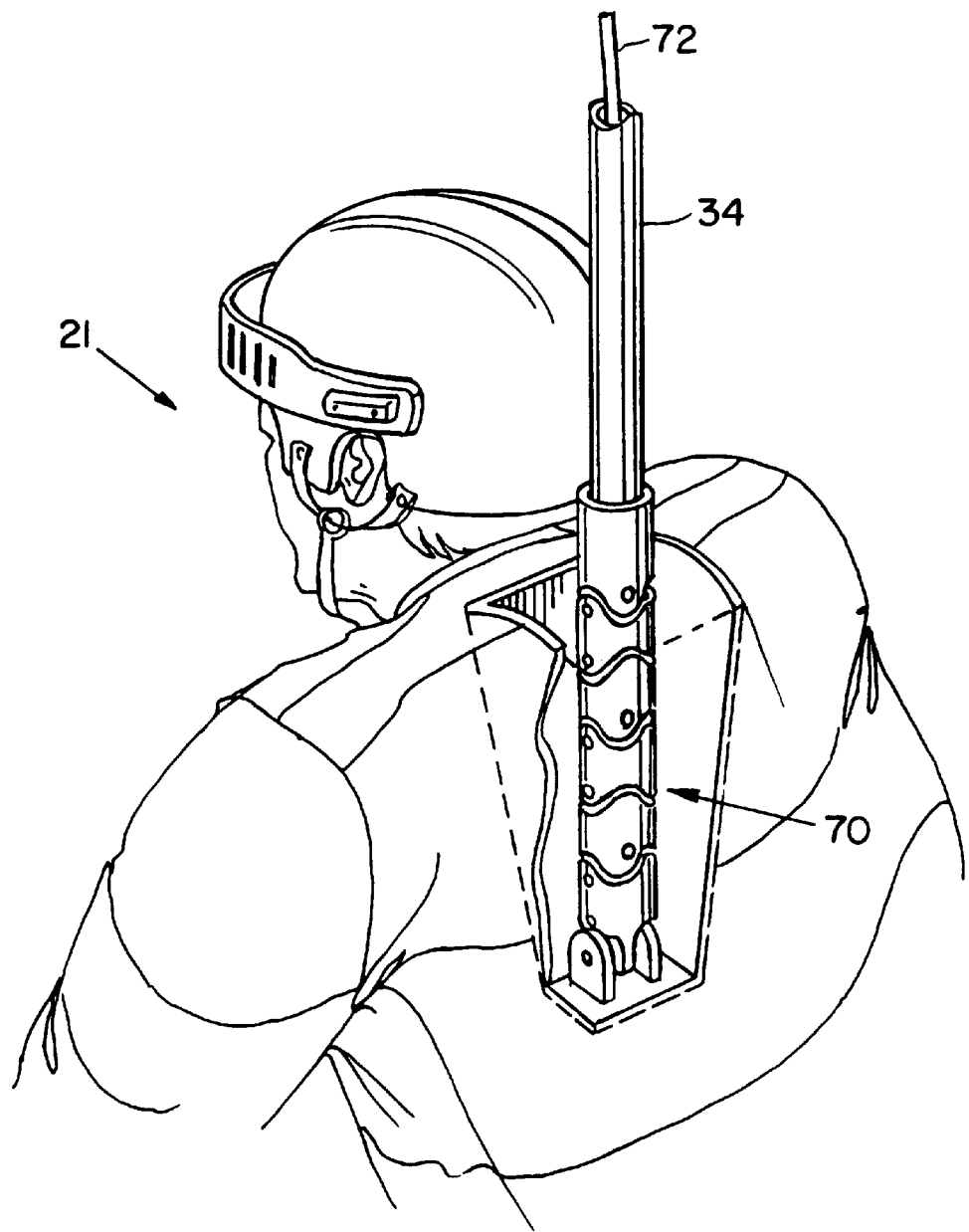
FIG. 5A is a perspective rear view of a mechanized robot of the invention illustrating the multiple universal joint which controls resistance and sway.
Figure 5B:
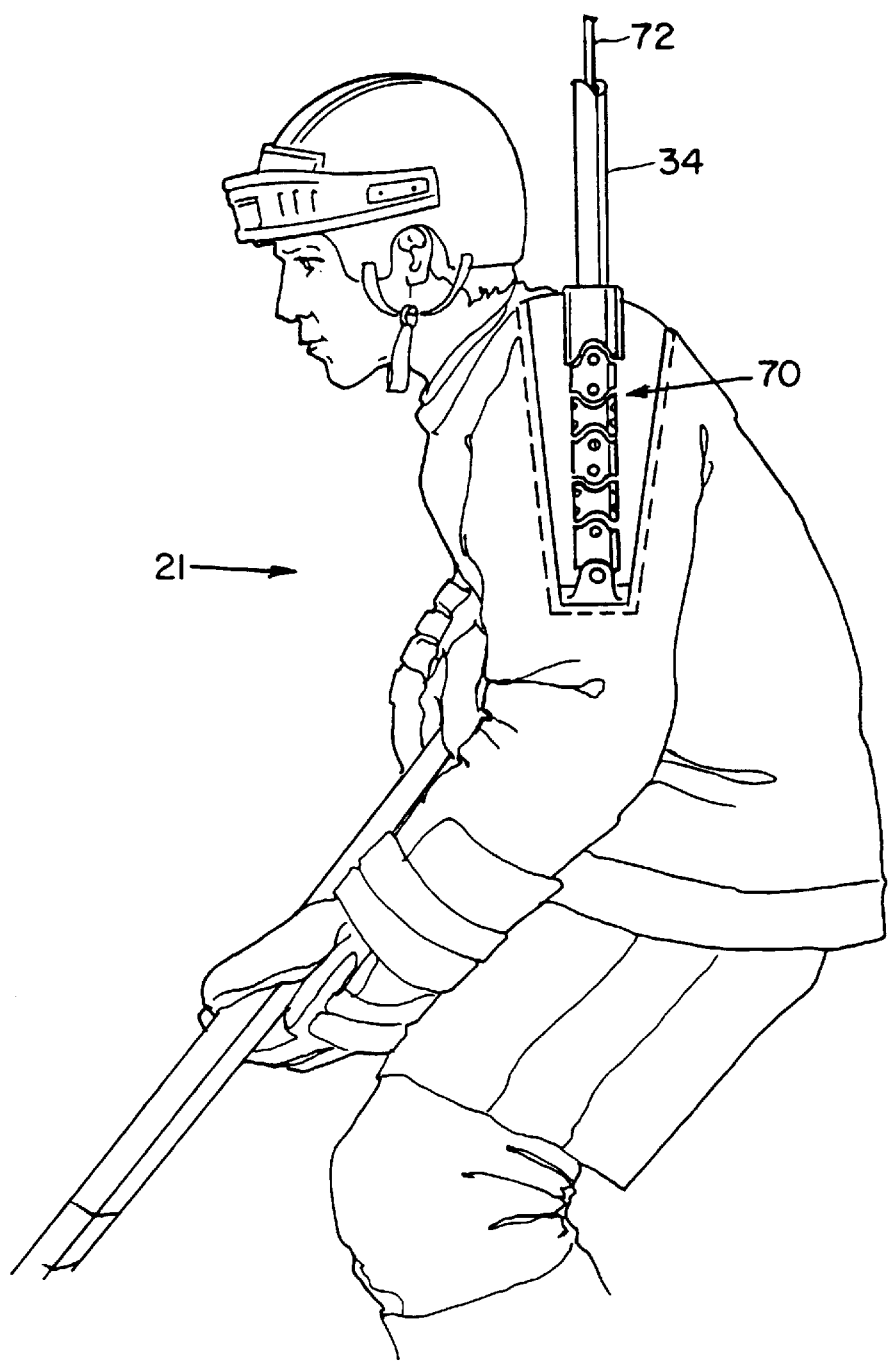
FIG. 5B is a side view of a mechanized robot of the invention illustrating the multiple universal joint of FIG. 9A.

Referring to FIG. 5A, the steel suspension tubes 34 that suspend the robots 21 from the track assembly are connected to the robots 21 by a multiple universal joint 70 that is controlled by electromagnetic force. The electrical cable 72 carrying electrical signals back and forth between the robot 21 and electronic and computer controlling and monitoring equipment 16 in the training area is contained within and, hence, protected from damage within, the tube 34. FIG. SB shows a side view of the multiple universal joint 70. By increasing or decreasing the flow of electricity to the universal joint 70, and, thereby, the rigidity or flexibility of the joint 70, the instructor or trainer, via the computer processing system 16, is able to vary the degree of resistance the robot 21 will offer upon contact by a player. Electric current also controls the sway of the robot 21 during movement across the ice 12. By varying the amount of resistance and sway and allowing the player to avoid or intentionally make contact with a robot 21, agility, balance, impact, speed, strength, and timing can be measured.

Figure 6B:
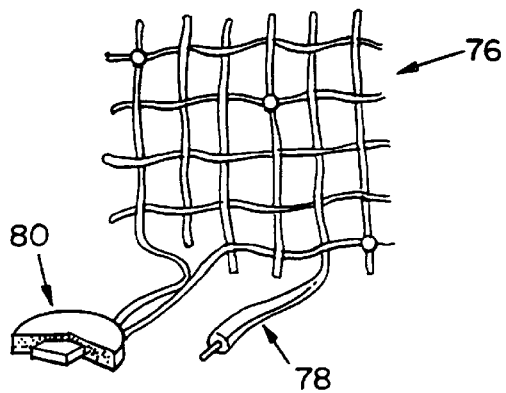
FIG. 6 is a schematic front view of a mechanized robot of the invention with a detailed illustration of a section of sensor mesh.
Figure 6A:
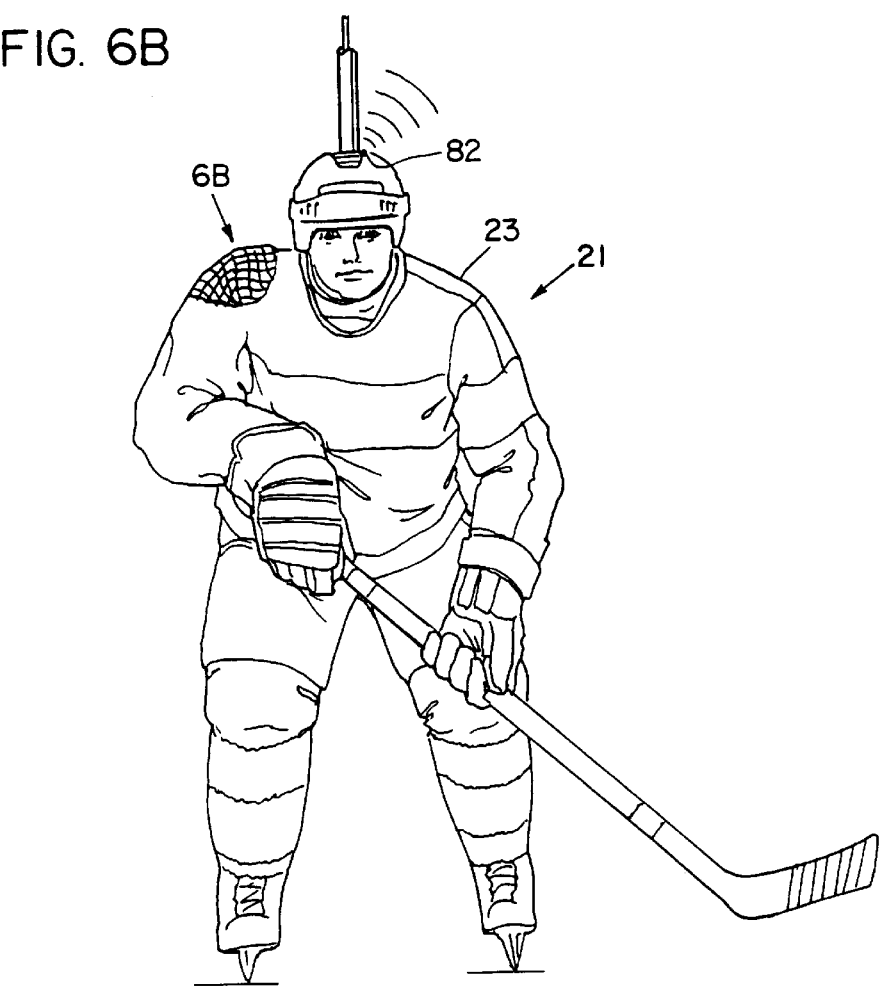

Referring to FIG. 6, performance measures describing each player's training session are communicated by sensors located inside the robots 21. Beneath the uniform 23, the robots 21 are covered with a flexible fabric containing a grid-like mesh 76 comprised of micro volt wiring 78 connecting a series of silicon sensor chips 80 that measure touch and force and count the number of times the robot is contacted. The sensor mesh 76 enables contact between a player and a robot 21 to be detected and measured. Each sensor chip measures the force at which the player impacts or hits the robot 21. The amount of force is measured in terms of electrical voltage which is then digitized by an analog to digital converter into a digital value which is transmitted to and stored by the computer system 16 in the training area. The sensor data is preferably transferred to the computer 16 over the bus 51 (see FIG. 4). Connected chips measure the magnitude of the check over the area of contact. In the preferred embodiment of the invention, the sensor mesh 76 is powered by lithium batteries. Alternatively, the sensor mesh 76 can be powered by motive power drawn via the suspension tube cable 72.

In another embodiment of the invention, each robot 21 is equipped with a small, shielded, battery-powered radio transmitter 82 which sends a frequency unique to that particular robot 21. When a player or puck contacts the robot 21, impact measurements from the sensor chips 80 are sent by microwave frequency to a receiver coupled to the processing system 16 in the training area. Separate frequencies for each robot allow for the identification of each players' impact measurements.

In a preferred embodiment of the invention, a unique identification code may be assigned to each robot 21. When data is transmitted by the robot 21, the identification code is transmitted first, enabling the computer 16 to uniquely identify each robot 21.

The transmissions from the robots 21 may be received in a variety of ways by the computer 16. In one embodiment, the computer 16 receives transmissions from each robot 21 in a sequential order, allocating a certain period of time for the transmission from each robot 21. When transmissions have been received from each robot 21, the computer 16 begins again with the first robot 21. Alternatively, the computer 16 can receive transmitted data only when a new reading, e.g., new impact data, has been measured by an individual robot 21.

In the preferred embodiment of the invention, readings from each sensor chip 80 within an individual robot 21 can be transmitted sequentially to the computer 16. In an alternative embodiment of the invention, the computer reads each sensor chip within an individual robot 21 simultaneously.

The numerical measurements transmitted by each of the robots 21 used during the instruction/practice session are received and stored by the computer 16. This enables the measurements to be fed back from the computer 16 and displayed on the computer display for the instructors and players. Feedback can occur in real-time and/or results can be played back in review sessions with the students or printed out in hard copy.

Video cameras placed above the skating surface 12 record training sessions to enable the instructor to obtain a visual record of players' performances. This record combined with the data obtained from the robots can be used to evaluate the player's total performance and serve as the basis of guidance and instruction to the player. The video recording of each maneuver or check can be overlaid on the computer display with data transmitted from the robots 21 indicating the speed, force of impact, or timing of each play. A synchronization switch ensures that the video recordings and the data measured by the robots 21 are coordinated in time. Feedback sessions provide visual and numerically measurable information concerning the player's performance during the training session. This facilitates discussion between the instructors and players regarding the player's level of achievement. The feedback session also suggest which program should be activated for the robots 21 during the next training session.

Each check (physical impact), pass, play, shot or other maneuver recorded by the video cameras can be displayed along with data describing force, location of impact, speed, and avoidance of contact (zero (0) contact being the highest avoidance score; indicating that the player has used acceptable speed during the drill). A grid template of the robot can be layered over the video image to show the location (or absence) of impact as a measure of the successful execution of a drill. The grid is colorcoded in a similar manner to a weather map to indicate the degree or force of impact in different locations on the robot 21.

In a preferred embodiment of the invention, overlay viewing of the data during video replay of practice sessions includes a computer display of practice results. For example, the display for unit number 6 (robot number 6) indicates that some number N of checks were received at "Y" magnitude of force. The display can also include "Z", the location of impact in numbers as well as a display of the area of contact on the template grid overlay. The information displayed enables the instructor and student to view and to interpret the interaction between the student and the robot for each check (i.e. the difference between a glancing impact or a solid check) based on visual as well as measured ability.

The impact data can be used by the computer 16 to calculate speed and force using simple formulas, $F=MA$, $V=AT$. The letter "M" represents mass which can be specified/measured for each student. Measurements can also be made of the student's post-check "recovery".

The measurement of impact force, impact speed, agility, balance, play set up strategy, and play react strategy are combined to form an overall review and learning matrix that allows for enhanced training and therefore a quicker, more efficient grasp of the skills required of aspiring hockey players.

The format of training sessions can be predetermined and precisely controlled by instructors and trainers. Training sessions can adopt the following or similar format:

(1) coach, instructor or trainer selects on-ice program from computer menu, (2) players are informed of on-ice program and shown a computer print-out diagram of the on-ice activity, alternatively a VCR film or interactive computer exercise serves as the pre-practice, on-ice, information vehicle, (3) robots 21 are positioned according to the program, (4) robots 21 are activated to execute the selected program, (5) on-ice session begins and continues, (6) player/robot interactive on-ice program ends, (7) information is transmitted to training area, (8) feedback session conducted with players.

Figure 7:
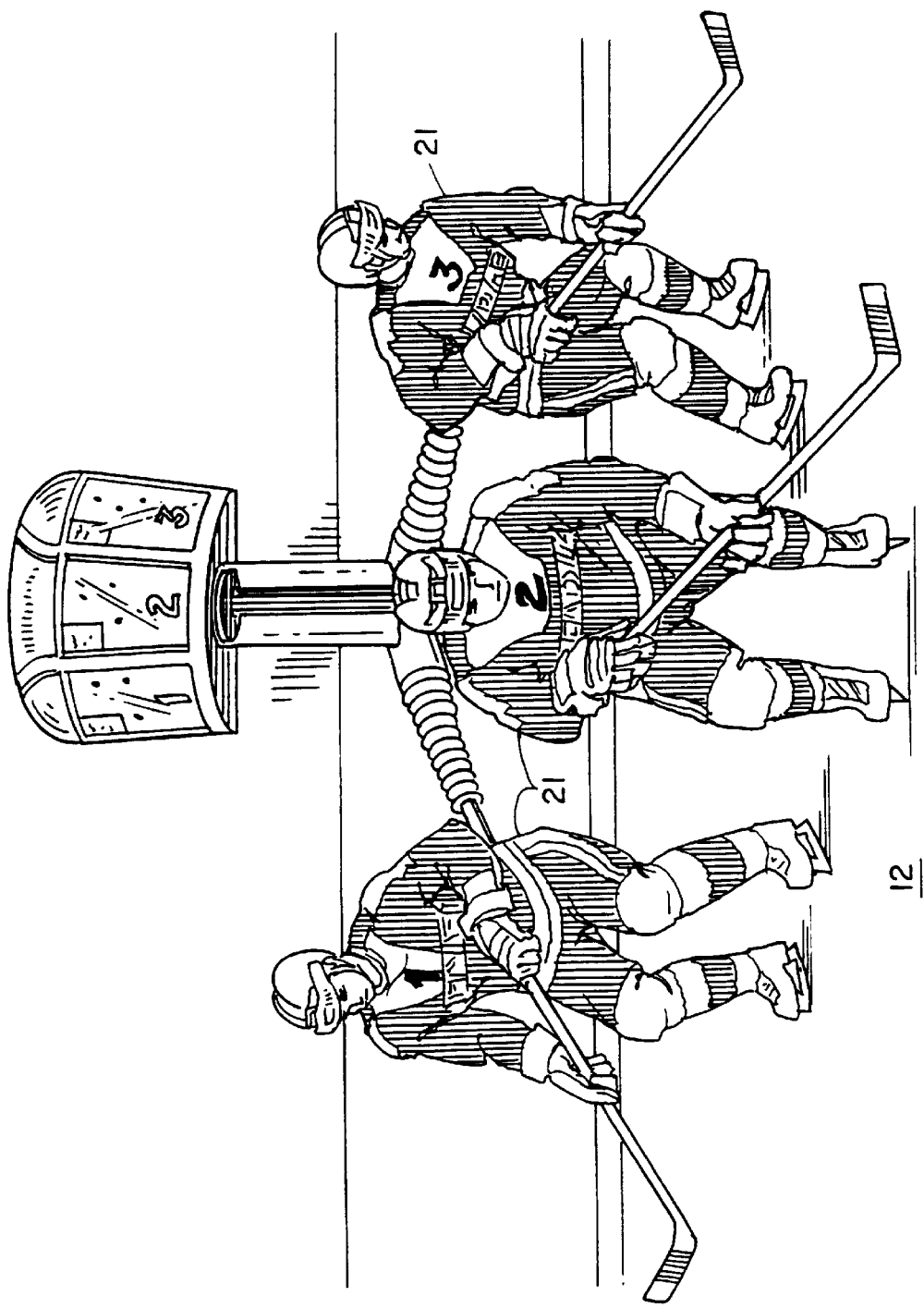
FIG. 7 is a front pictorial view of three robots in fixed positions for use as checking targets when practicing form or measuring force of impact or both.

In addition to varying the number of robots 21 on the ice during a training session, individual arrays or patterns of movement and speed of the robots 21 can be controlled by a computer program. The instructor or player makes selections from a menu that consists of pre-programmed patterns or scenarios for specific skating formations which will be executed by individual robots 21 or teams of robots. These programmed formations can be changed and varied during training or remain fixed throughout the practice session. This allows for programmed drills as well as a more freestyle training mode for developing play set-up and play react training. In addition, robots 21 may be used in a relatively fixed position as shown in FIG. 7 as checking targets where lateral impact force may be applied against the robots 21. These robots 21 are positioned in various stances so that they can be checked, i.e. physically "contacted" by skaters.

Figure 8:
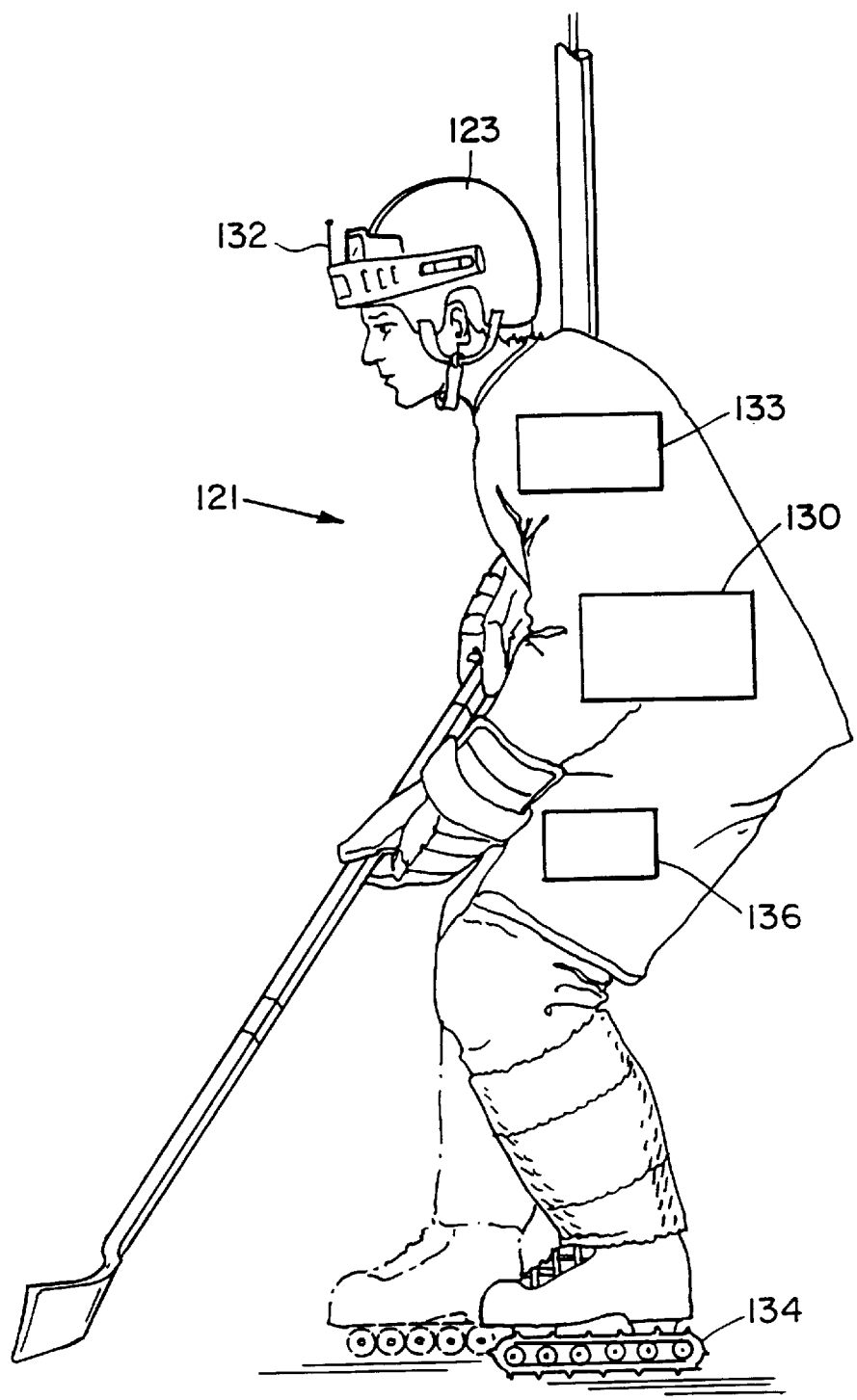
FIG. 8 is a schematic side view of an alternative embodiment of a mechanized robot in accordance with the present invention.

An alternative embodiment of the robots of the invention is an automated surface robot 121 similarly designed to resemble a hockey player but able to move independently of an overhead track. FIG. 8 is a schematic pictorial view of one of the automated surface robots 121 partially cut away to show internal components of the robot 121 in schematic block diagram form. Referring to FIG. 8 the robots 121 are powered by internal batteries 133 and/or other self-propelling power source which can be an internal combination engine 130 within the robot 121. The robot 121 is preferably controlled by short wave radio or microwave signals or other remote control or, alternatively, by an internal control system or device. In the remote control configuration, the helmet 123 includes a band which includes an antenna 132 attached thereto for receiving the appropriate signals. The robot 121 preferably includes an internal processor 136 and associated circuitry such as PAM, ROM, I/O control, etc., to direct locomotion. In the remote control configuration, the processor 136 decodes received signals to generate control signals for motors, solenoids, relays and other internal components which control movement of the robots 121. Where local (internal) control is used, the ROM inside the robot stores a series movement commands used to control the robots 121 to move in a preset routine. The automated surface robots 121 move on plural, preferably six, miniature, rubber tires or, alternately, on rubber tracks 134 or on any other suitable surface movement apparatus.

In a fashion similar to the suspended robots 21, the automated surface robots 121 simulate plays and maneuvers typical to the sport of ice or roller hockey. The instructor, coach or player makes a selection from a computer menu that contains pre-programmed patterns or scenarios of skating pathways or formations, which are to be executed by individual robots 121 or teams or robots. Information controlling the movements of robots 121 is transmitted by computer and radio or microwave or other system to receivers inside each robot. Alternatively, the robots 121 can be used in a fixed location as practice devices. In all cases, hockey sticks can be raised, lowered, held in one position or caused to move as desired.

Beneath their uniforms, the automated surface robots are covered with the same sensor mesh 76 previously described for the suspended robots 21. Contact between the robots 121 and players is detected and measured by the sensor mesh 76. Sensor data is transmitted to the control computer 16 ant stored within the system. Feedback and record-keeping are conducted in a manner similar to that conducted for the suspended robots 21.

Regarding the above description, it is important to observe that ice hockey is a dynamic sport. Controlled, preprogrammed robots enhance training and instruction in ice hockey because robots can be made to repeatedly and precisely perform moves and maneuvers encountered during actual play. Robots can therefore supply simulated dynamism without the drawbacks, delays, mis-executions, and other drawbacks that often accompany having other skaters (or, for example, orange traffic cones) serve as objects for practice purposes.

Robots can repeat the opponents' "ideal" plays and maneuvers (even those that are rarely encountered or are known to be used by particular opponents) so that the performance of students/skaters can be perfected. In existing practice sessions a player usually practices opposite the instructor or another players. Since a player or instructor is prone to human error or simply fatigue, maneuvers and skills cannot be repeated in a desired optimal fashion. Players may learn bad habits while playing opposite a less than ideal opponent or by emulating a less than ideal example. Use of this invention enables players to practice and to repeat skills and plays against an opposing robot or team of robots that can perform in a consistent manner every time. For ice hockey instructors, trainers, coaches, and players the development of skills is enhanced by the use of robots (as adjuncts to live play, i.e. to supplement not supplant live play) for improving fundamentals as well as for learning more complex plays and maneuvers.

As mentioned above, the formation and drills executed by the robots during a training or entertainment session are selected by the instructor, coach or player from a menu. The menu is presented to the use on the display of the computer system 16 in the training area. The computer system 16 performs functions such as (1) maintaining databases of players and teams, (2) controlling and monitoring use of the rink, (3) scheduling maintenance and use of the rink, (4) programming, executing and monitoring activities on the rink which use the sensing and monitoring devices and/or the mechanized robots, (5) background computer processing functions, and other computer processing system functions.

Figure 9A:
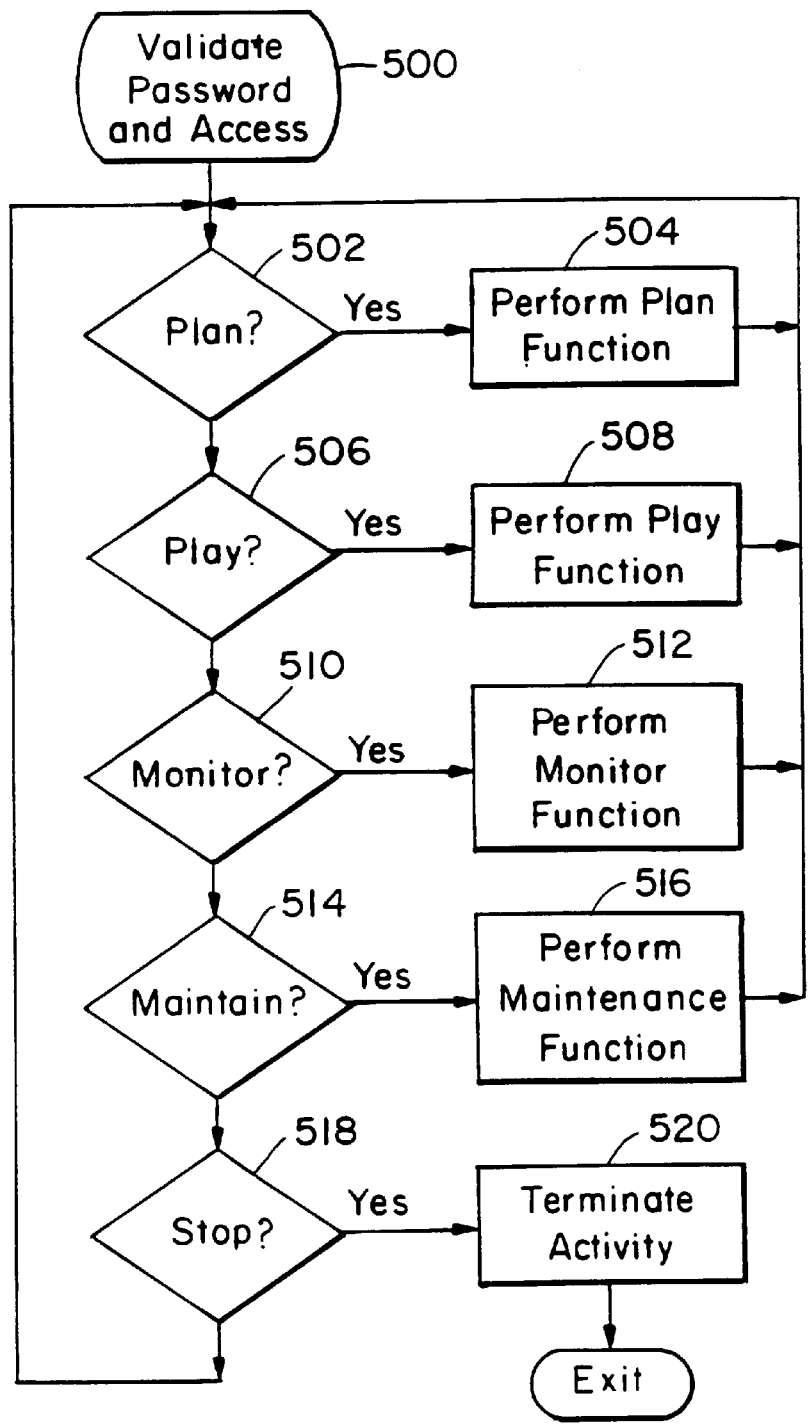
FIGS. 9A–9F contain flowcharts which illustrate the logical flow of the user-interactive computer system of the invention in controlling and monitoring activity on the rink of the invention.
Figure 9B:
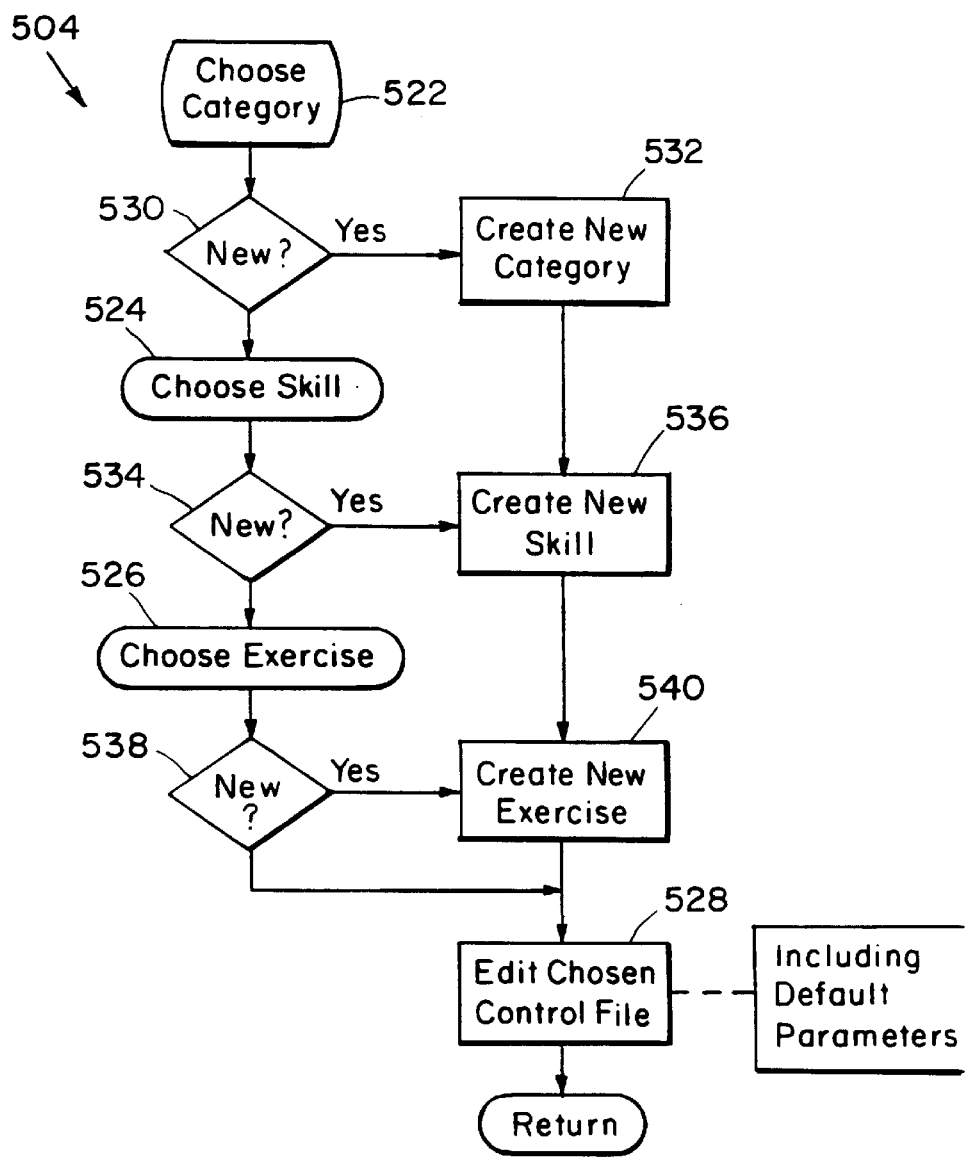
Figure 9D:
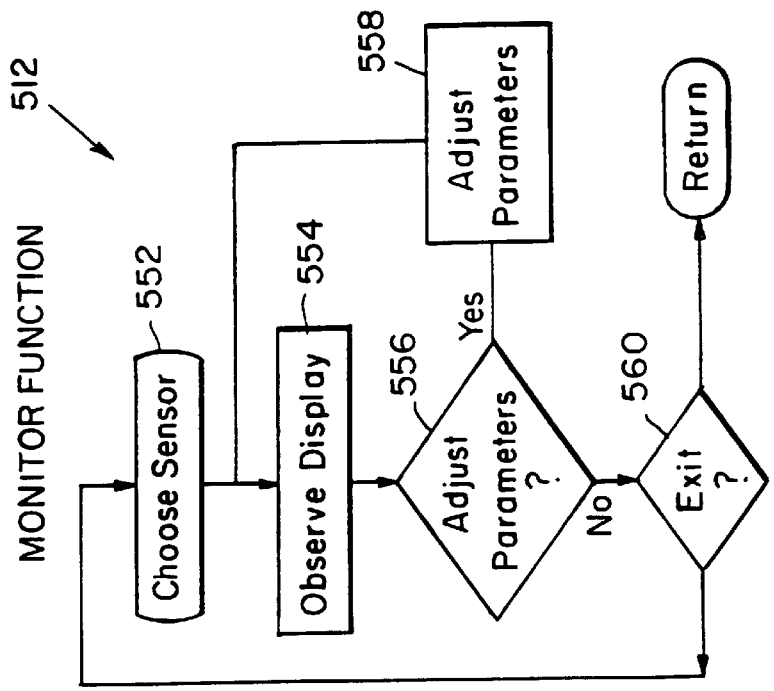
Figure 9C:
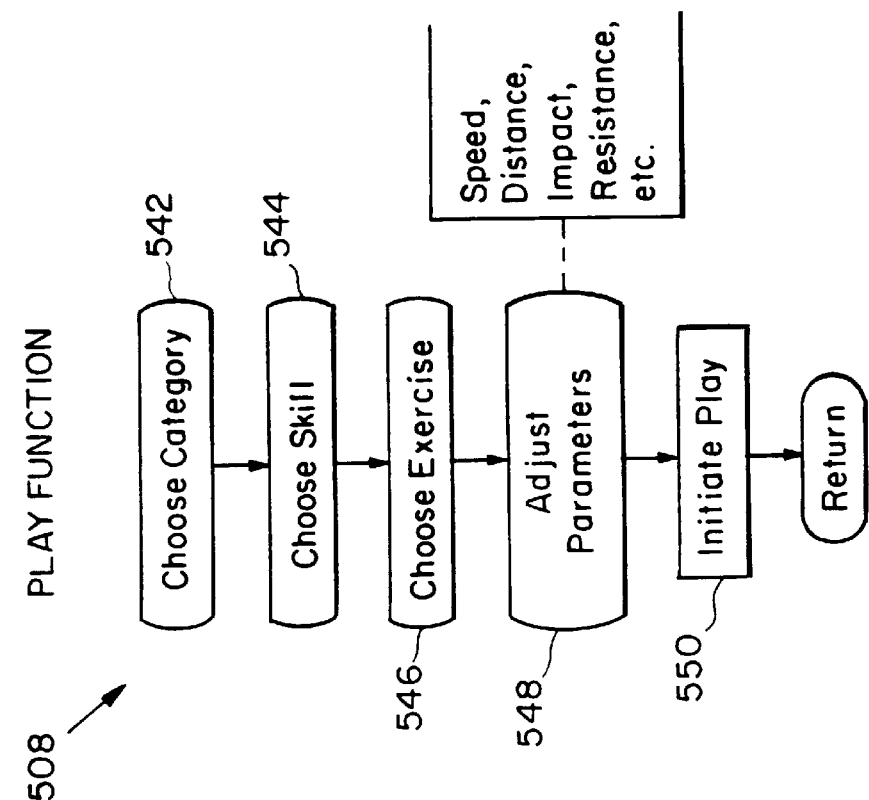

FIGS. 9A–9F contain flowcharts which illustrate the logical flow of the computer system 16 of the invention in performing the above and other tasks. FIG. 9A is a toplevel flow diagram which shows the logical flow from the main menu presented to the user. In step 500, the system 16 inputs a password from the user and identifies it as being valid to permit access to the system. A loop is entered in which the system awaits an input from the user. If the user elects to plan an exercise (step 502), then the plan function is performed in step 504. If the user selects a play function (step 506), then the play function is performed in step 508. If the user selects a monitor function (step 510), then the monitor function is performed in step 512. If a maintenance function is selected in step 514, then the maintenance function is performed in step 516. If the user elects to end a session in step 518, then the activity is terminated in step 520. FIG. 9B illustrates a detailed flowchart of the plan function 504; FIG. 9C is a detailed flowchart of the play function; FIG. 9D is a detailed flowchart of the monitor function; and FIGS. 9E and 9F contain detailed flowcharts of the maintenance function.

The details of the plan function, in which the user can plan an exercise for execution, are shown in FIG. 9B. The exercises are preferably chosen by a top-down logical approach in which a category is first chosen, then a skill within a category is chosen, and finally an exercise within a skill is chosen. More levels of detail are possible depending upon a particular system implementation. For example, in the sport of hockey, possible categories can include speed building, strength building, agility, team/individual play and reaction time. Within each category, several skills are possible. For example, within the speed building category, skills can include a forward dash, a crossover, skating circles and stickhandling. Finally, within each of the skills, several exercises can be executed. For example, one exercise can be executing a particular skill around cones. Another can involve shooting a puck at a moving target or passing a puck to a moving wing man or passing between opposing players.

In executing the plan function, the user first chooses a category in step 522, then chooses a skill in step 524 and then chooses an exercise in step 526. Finally, the user can edit the control file that stores the selected exercise in step 528. This involves varying certain parameters such as the speed at which the exercise is executed, or how close together opposing robots are. It can also involve selecting or editing default parameters to be used for the exercise.

At each selection step 522, 524, 526, the user can define a new category, skill or exercise, respectively, if desired. At step 530, the category input is checked to determine if it is a new category; at step 534, the skill selection is checked to determine if the selected skill is new; and at step 538, the exercise input is checked to determine if it is new. If a new category is entered, a new category creation function is executed in step 532, then a new skill creation function is executed in step 536 and a new exercise creation function is executed in step 540. If a new skill is selected in step 524, then the new skill creation function is executed in step 536 and the new exercise creation function is executed in step 540. If a new exercise is selected in step 526, then only the new exercise creation function is executed in step 540. Hence, the system of the invention provides the user with added flexibility to enable him/her to plan exercises as desired. Alternatively, preprogrammed canned exercises can be stored on storage medium such as optical or magnetic disk and input to the system as desired.

Referring back to FIG. 9A, if the user selects the play function in step 506, the play function of the system is performed in step 508, the logical flow of which is diagrammed in FIG. 9C. Referring to FIG. 9C, to execute the play of an exercise, the user can once again choose a category in step 542, a skill in step 544 and an exercise in step 546. Alternatively, the user can select a preplanned exercise by mnemonic name or number stored with the exercise during the plan function. Again, the parameters can be adjusted in step 548. Next, the play is executed in step 550. This involves the processing system 16 commanding the robots and/or sensors to perform and/or monitor the exercise. At the same time, players interact with the robots and/or sensors during the play of the exercise as practice, training or entertainment.

Referring back to FIG. 9A, if the user selects the monitor function in step 510, the monitor function is performed in step 512. A logical flow of the monitor function is shown in the flowchart of FIG. 9D. In executing the monitor function 512, the user selects for display the outputs of one or more sensors during execution of an exercise. The sensor can be one or more of the sensors on one or more of the robots, one or more magic eye sensors used to detect speed, the video generated by one or more of the video recorders, etc., or any combination thereof. Where a video output is combined with some other output, the two can be superimposed on the display.

In step 552, the user chooses a sensor for display. The output of the sensor is routed to the display and the user can observe the output on the display in step 554. The system will also prompt the user for an input regarding the adjustment of any of the playing parameters in step 556. If the user desires, the parameters can be adjusted in step 558, and the results can be observed on the display in step 554. Adjustment of parameters during the play and monitor functions allows the user to modify the exercise in real-time and have immediate feedback as to the results of the modification. The user can exit the monitor function through step 560 or can return to the top of the function where another sensor can be selected in 552. This process can continue, adding as many sensors as are practical.

Figure 9E:
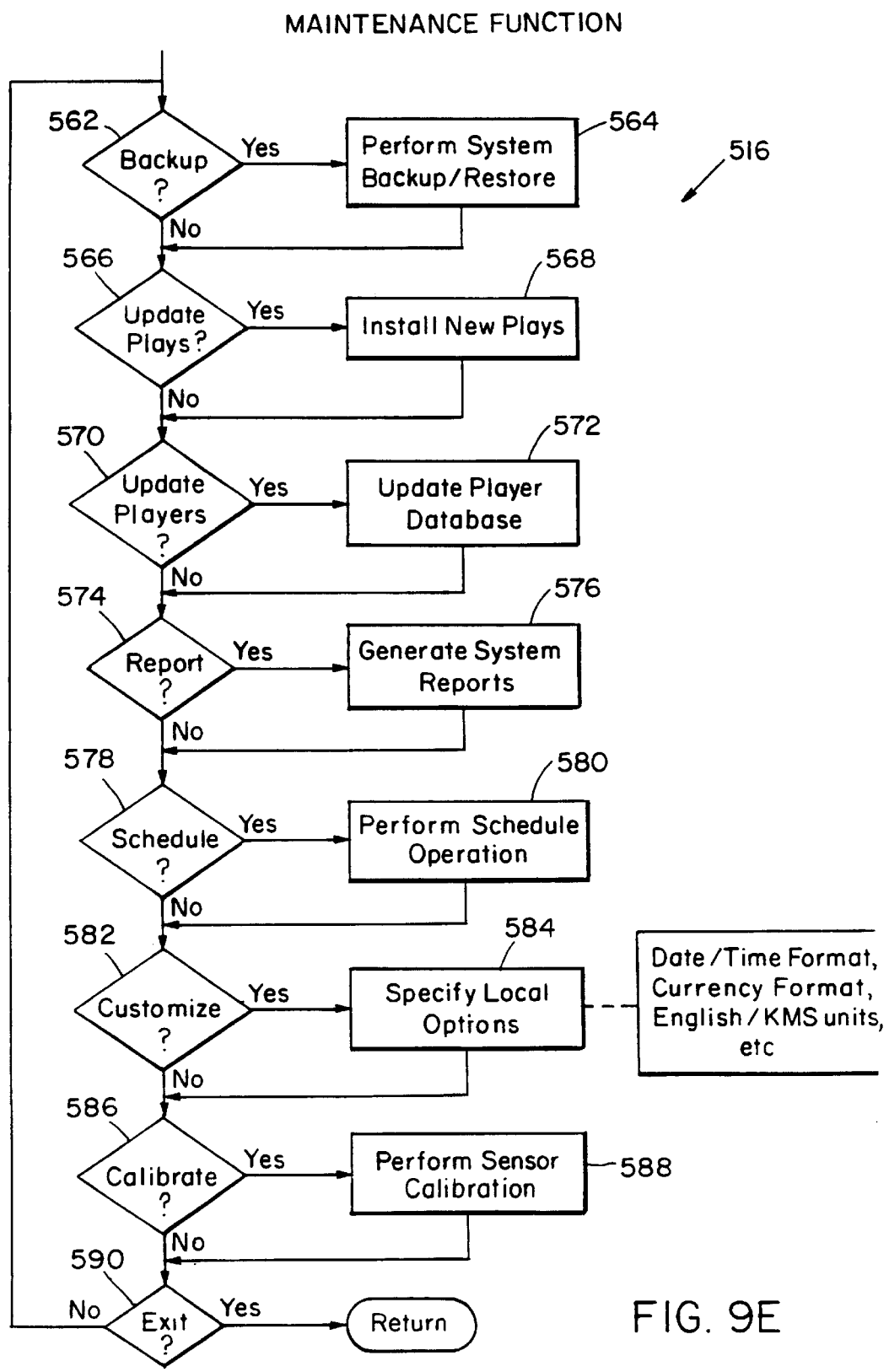

Referring again to FIG. 9A, if the user selects the maintenance function in step 514, it is executed in step 516. The details of the maintenance function are shown in FIG. 9E. The maintenance function is used to perform database management for the player/team databases, to perform rink-related computer functions and to perform ordinary computer background functions such as memory backups.

Figure 9F:
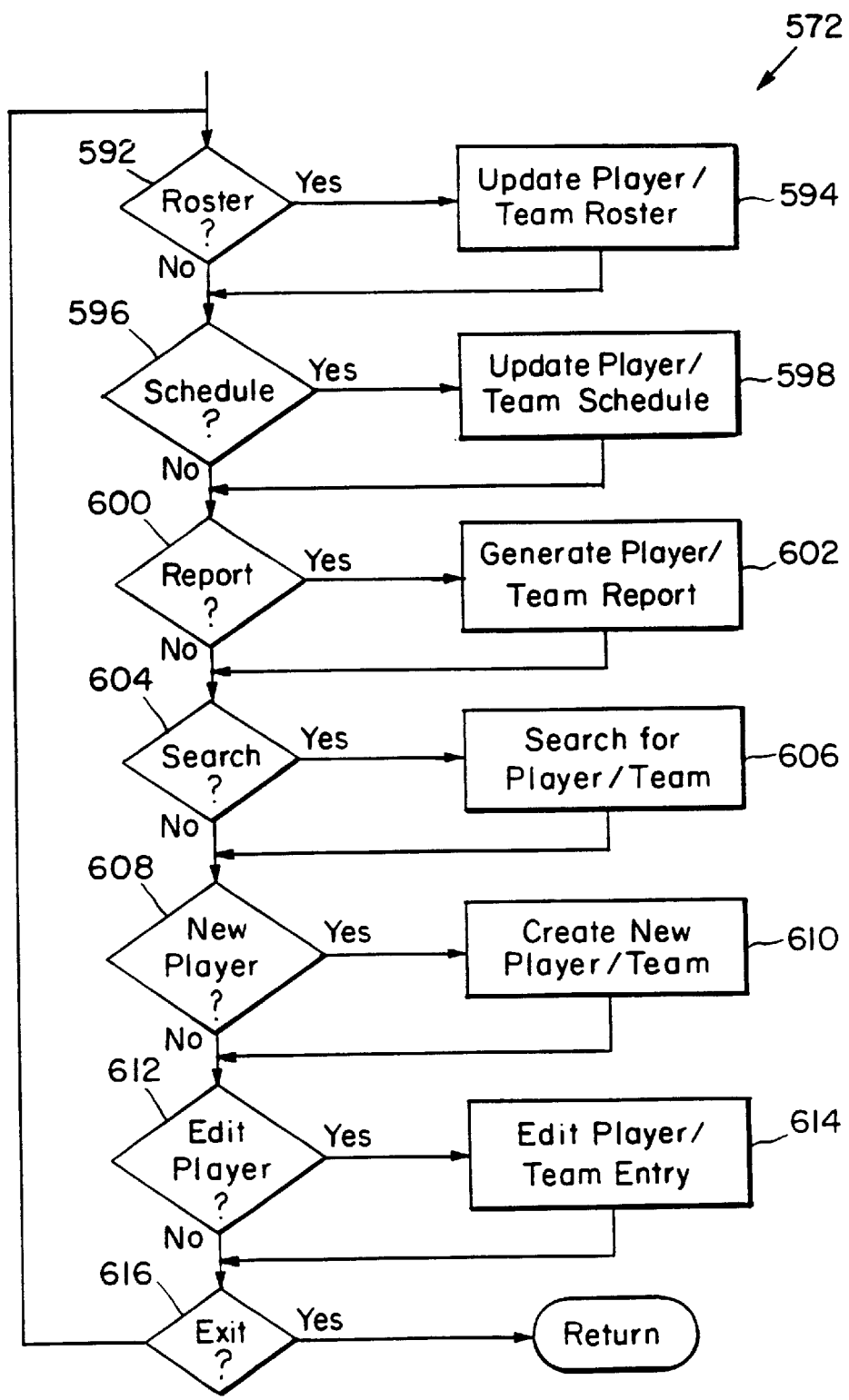

Upon entering the maintenance function, the user is presented with a series of options. If the user chooses to backup the system in step 562, system backup is performed in step 564. If the user elects to update the plays stored in the system in step 566, new plays or exercises are installed in step 568. This can involve loading a set of prestored canned plays from a storage medium such as optical or magnetic disk. The plays can be purchased from an outside manufacturer or may have been previously created and stored on the storage medium by the player or other user. In step 570, the user can elect to update data stored for individual players or teams of players. The player database update function is executed in step 572. The detailed logical flow of the player database update function 572 is shown in the flowchart of FIG. 9F.

In step 574, the user can elect to generate a system report, which is done in step 576. The system report can be presented on the system display or it can be printed out in hardcopy. The information it contains can be customized by the user and can include such information as player performance results, team performance results and rink conditions such as the temperature of the rink at the surface of the ice, the number of hours of ice use which have occurred since the last resurfacing, the energy consumption of the rink, etc.

The system of the invention can also be used to schedule rink usage and maintenance time. The schedule operation can be selected by the user in step 578 and is executed in step 580. In step 582, the user can elect to customize the system in step 584 according to local conditions. The conditions include local time and date, English or metric units, currency format, etc. In step 586, the user can opt to calibrate any or all of the sensors in step 588. The user can exit the maintenance function in step 590 and return to the main menu.

As mentioned above, FIG. 9F illustrates the logical flow of the player database updating function 572. The player database can include an extensive collection of player, team and/or rink information. For players, the database typically includes players' ages, skill levels, height, weight, attendance, names of parents, telephone number, team name, etc. It can also include data relating to the players' performance on practice exercises. For teams, the database can include the name of the team, the team roster, schedule of games for a particular season, performance of the team in exercises, an aggregate of the team's players' performances in exercises, etc.

Significantly, the database is customizable by the user, coach or instructor. Therefore, the instructor can decide the types of data that are important to him or her and can ensure that they are stored for review in the future.

The flowchart in FIG. 9F contains a representative list of functions which can be performed within the database updating function 572. Many other optional functions can be performed since the database is completely customizable to the user's needs. The user can select in step 592 to update a player/team roster in step 594. In step 596, the user can elect to update the playing and/or practicing schedule of a player and/or a team in step 598. In step 600, the user can opt to generate a report in step 602 for a player and/or a team. The report can include data related to player and/or team performance on a variety of selected exercise drills or games. The database also includes a searching function 606 which can be selected by the user in step 604. By inputting the name of a player or team, the data for that player or team can be located for display, printout or further searching. The user can select in step 608 to add a new player or team to the database in step 610. The user can also select in step 612 a function in step 614 which allows the user to edit a player and/or team entry in the database. The user can choose in step 616 to exit the database function and return to the main menu.

Figure 10:
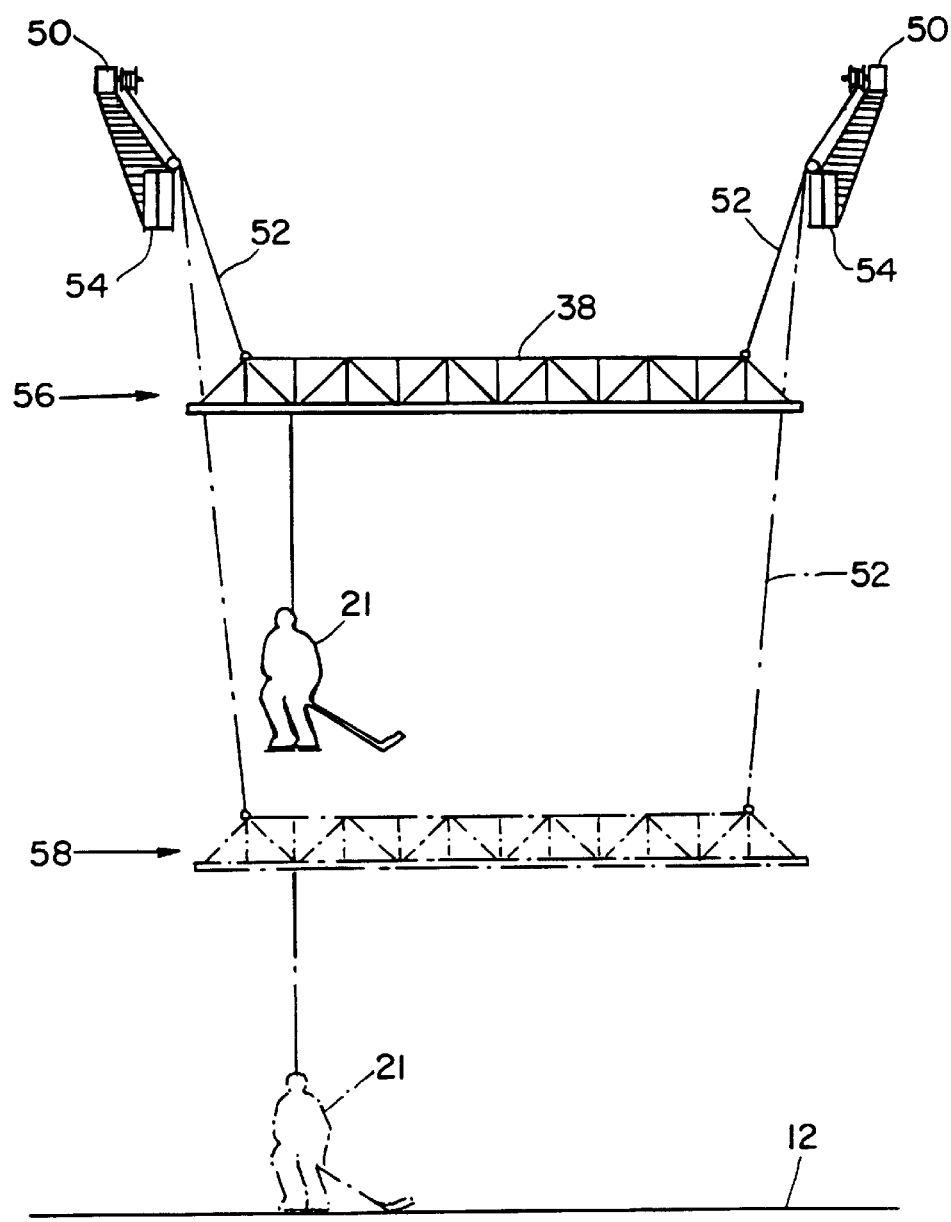
FIG. 10 is a schematic elevational view of the support structure of the present invention showing the raised and lowered positions.

Referring now to FIG. 10, when not in use, the support structure 36 with track assemblies 38 and robots 21 can be raised to a position above the ice 12 where they will not interfere with other activities on the surface 12. Each track assembly 38 is suspended by four steel cables 52, each cable approximately one inch thick. The cables 52 are suspended from the steel superstructure 54 of the building frame. Each track assembly 38 moves between a raised position 56 (approximately 32 feet above the surface of the ice) and a lower position 58 via four hoist motors 50 located above the building frame 54. In the lowered position 58, the robots 21 are approximately ¼ inch above the surface of the ice 12.

Figure 11A:
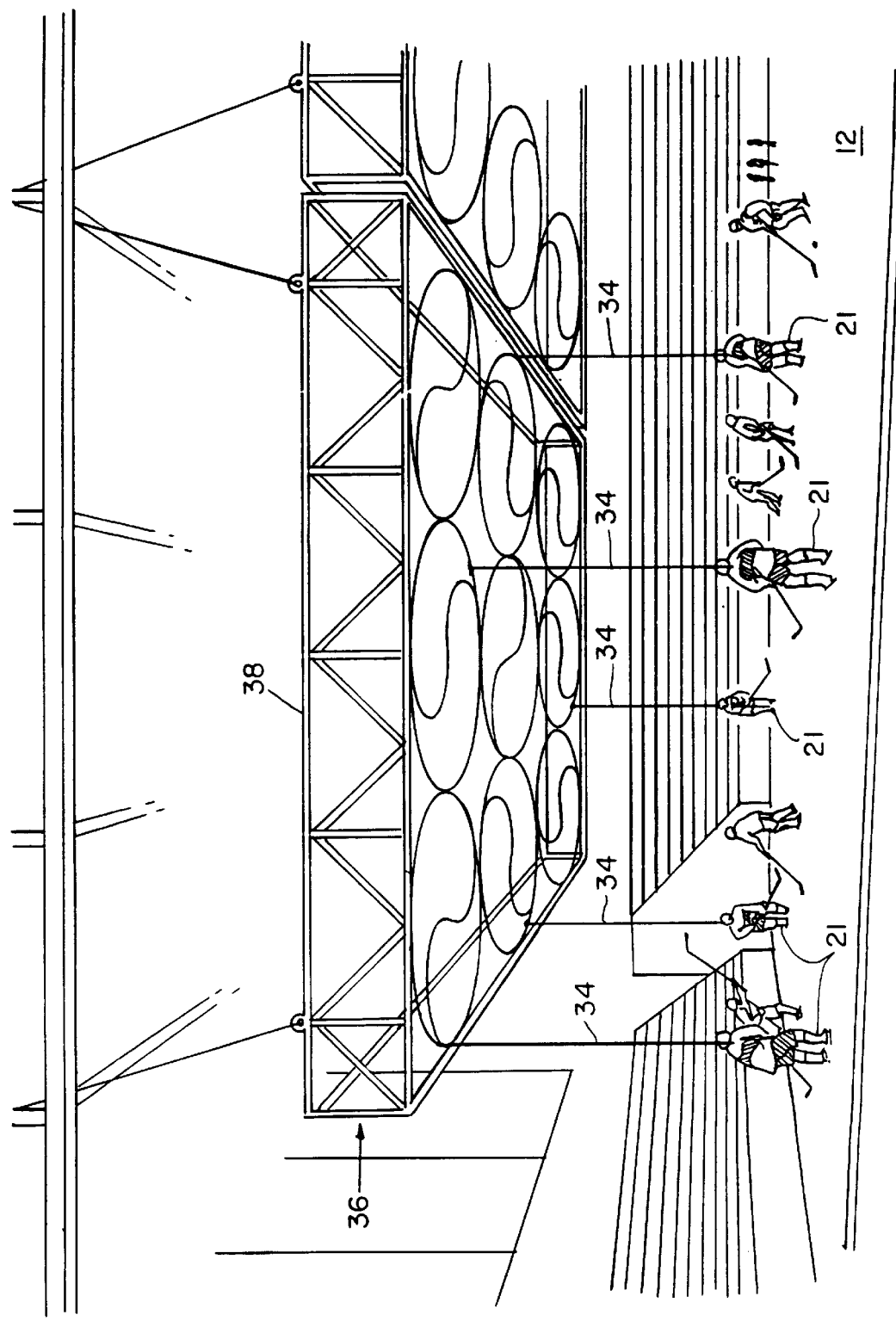
FIG. 11A is a perspective view of the robots and support structure of the invention in the lowered position.

FIG. 11A shows a perspective view of the robots 21 in the lowered position 58 as they are used during a training session. FIG. 11B shows the robots 21 raised above the surface of the ice 12. When the robots 21 are in the raised position 56, the ice rink 10 may be used for hockey games, practice sessions, or other skating functions.

FIG. 12 is a side view of a suspension cable 52 connected to a track assembly 38. Each cable 52 is attached to the track assembly 38 by a steel eyebolt 60.

FIG. 13A contains an elevation view indicating how a suspension cable 52 is fed to a hoist motor 50. Each of the four suspension cables 52 for each track assembly 38 is controlled by its own motor 50. The four motors 50 simultaneously raise and lower the track assembly 38. Each suspension cable 52 is guided by a pulley 64 which is connected to the frame 54 of the building by a structural steel pulley mount 66. The hoist motor 50 is positioned above the building frame 54 by a structural steel standoff bracket hoist motor mount 68.

FIG. 13B contains a plan view of a hoist assembly. This diagram illustrates that each hoist assembly, containing a hoist motor 50, steel cable 52, and guide pulley 64, is preferably connected at an angle to the guilding frame 54. The positions of the four hoist motors 50 and suspension cables 52 are also illustrated by FIG. 3.

Figure 14:
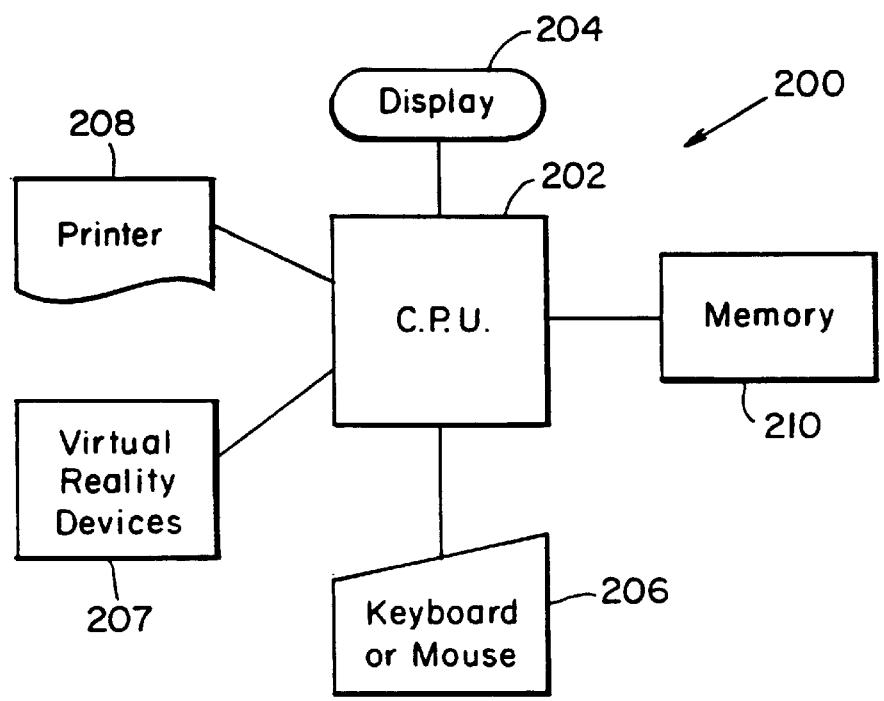
FIG. 14 is a schematic block diagram of a computer system according to the present invention.

FIG. 14 contains a block diagram of one embodiment of the computer system 200 for simulating skating and hockey maneuvers and for entertainment use according to the present invention. The system comprises a central processing unit (CPU) 202 which can be, but is not limited to, a microcomputer such as a personal computer operating with an Intel 80X86 microprocessor, a Motorola 680X0 processor, or a Power PC processor. The CPU 202 is coupled to a display 204, such as a CRT screen, for displaying images and prompting the user for the input of information. The CPU 202 is also coupled to an input device 206 such as a keyboard, joystick, etc., for the input of information from the user and a printer 208 for printing player/student accomplishment information in hard-copy format. Input and output with the user can also be accomplished with virtual reality devices 207 such as a virtual reality glove and helmet worn by the user. A memory 210 is provided, coupled to the CPU 202, for the storage of recorded images and other information.

Several versions of computer programs are encompassed by the present invention. Each version varies in complexity as each is directed toward a player/student at a different level of expertise. Versions developed for home, rink, and arcade use are instructional as well as entertaining. More complex versions for use in structured training facilities are developed. For each version, the computer system stores a series of lessons and corresponding "ideal" images in a database.

Figure 15A:
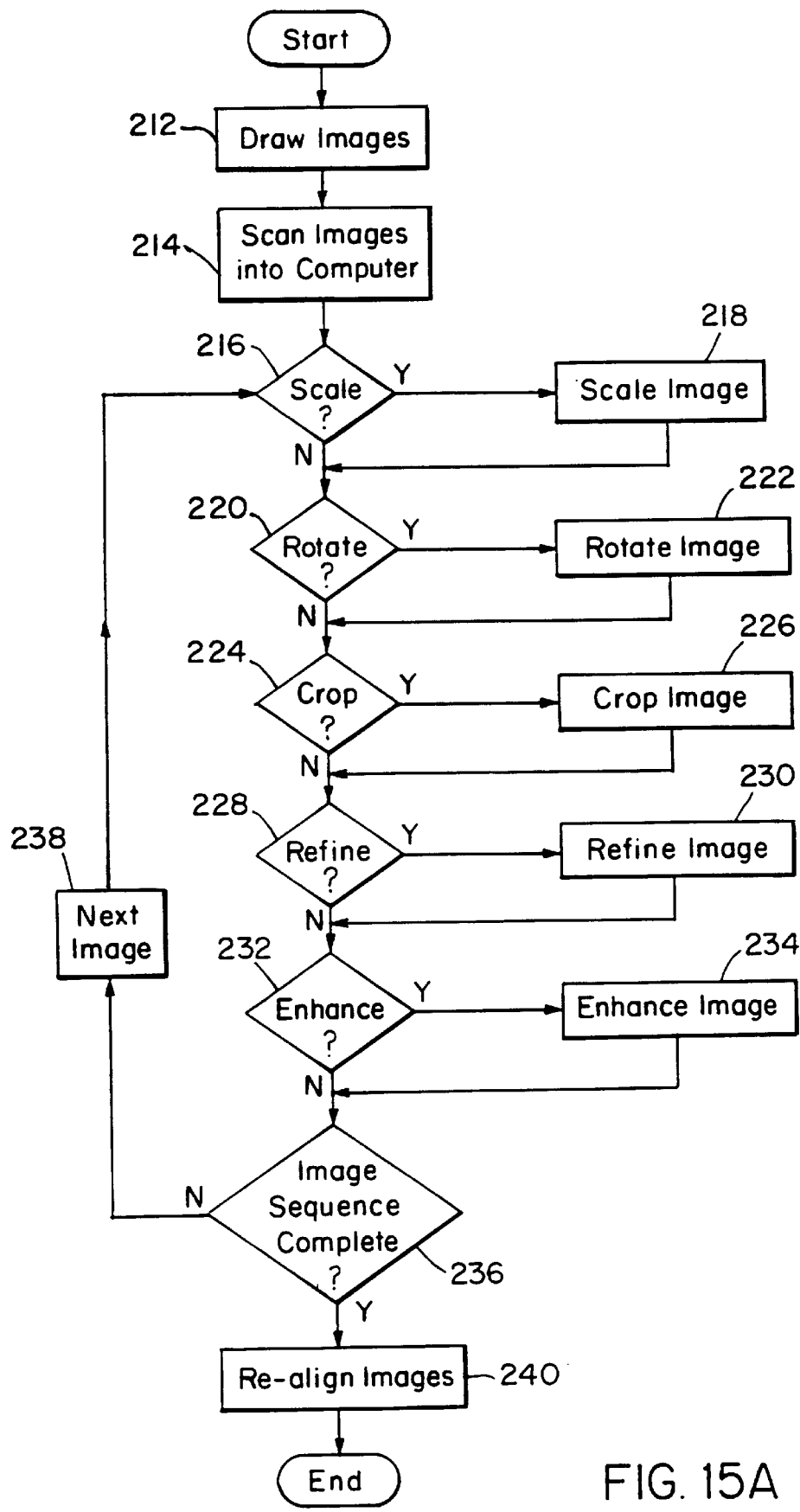
FIGS. 15A–15E contain a flowchart of the system of the present invention.

FIGS. 15A–15E contain a flowchart for the preparation and operation of the system of the present invention. FIG. 15A shows the procedure for scanning images into the computer system 200 and preparing them for display on the computer screen 204.

Referring to blocks 212 and 214, images for a particular skill or maneuver are scanned into the computer system 200. Individual drawings are created and scanned to complete the sequence of the "master" or "ideal" hockey player performing the skill or maneuver as well as to encompass all possible movements that the player/student-controlled ("adopted") player may perform.

After all the ideal images in a given sequence have been scanned, the images can be prepared for display on the computer screen. This can be accomplished with a number of commercially available computer packages, including Photoshop, Photofinish, NeoPaint, Paint, Graphics Designer, and Correlpaint. In blocks 216, 218, 220 and 222, the images can be scaled or rotated, as necessary. If any images contain unwanted elements, they can be cropped in blocks 224 and 226. In blocks 228 and 230, the images can be refined to remove unwanted lines or blotches or to add lines that have faded during scanning. In blocks 232 and 234, the images can be enhanced by adding elements such as background or motion lines. Each image is prepared in turn in the loop under control of blocks 236 and 238. After each image in the sequence has been prepared, they are aligned with each other on the computer screen in block 240. The preparation stage ensures that the images will be displayed as a smooth animation sequence when the program is run by the students.

In an alternative embodiment of the invention, images recorded by video tape may be used instead of the hardcopy drawings described above. In this case, video recordings are made of a particular skill or maneuver. Each frame of the video tape is digitized so that it can be stored in computer files using a standard such as JPEG (Joint Photographic Expert Group), MPEG (Motion Picture Experts Group), FLI, FLC, etc. The sequence of images is refined in the manner described in connection with FIG. 15A. The result is a series of images in computer-readable form similar to those obtained from the hardcopy drawings described above.

Figure 15B:
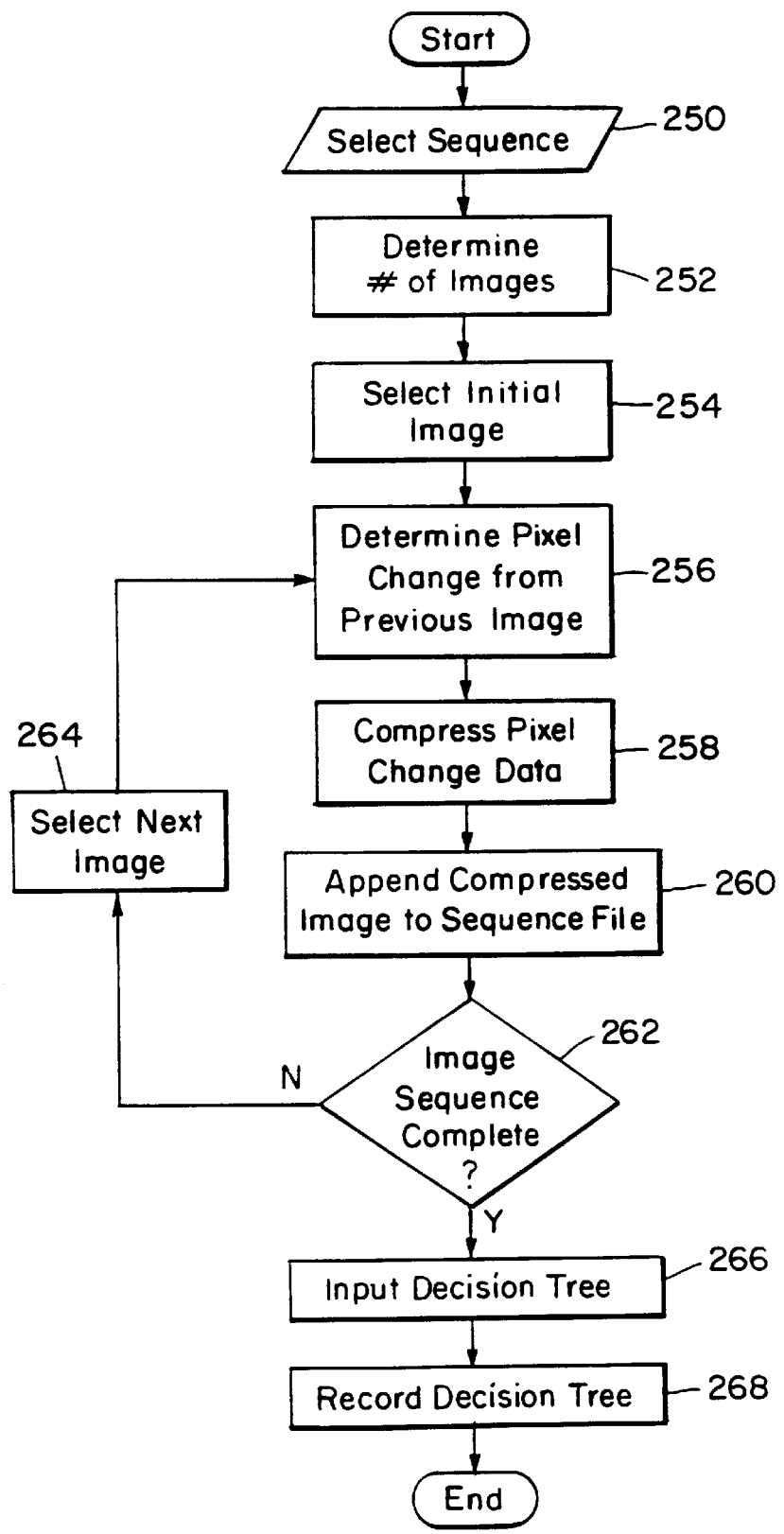

FIG. 15B contains a flowchart showing the process of compressing the computerized files containing each sequence of drawings to conserve storage space. The process involves comparing each drawing to the next one in the sequence and recording only those pixel elements which have changed from one drawing to the next. Other compression techniques also exist and may be used.

In blocks 250 and 252, a sequence of images is selected, and the number of images in the sequence is determined. Beginning in block 254, with the initial image that would appear on the screen, each drawing is compared to the previous drawing in the sequence. In the case of the first drawing in the sequence, the comparison is made to a blank screen. Each pixel element which has changed from one drawing to the next is identified in block 256 and the change data is compressed in block 258. The compressed data is then stored in a sequence file in block 260. This procedure is repeated for each drawing in the sequence in blocks 262 and 264.

Referring to blocks 266 and 268, the relationship between each of the drawings is input in the form of a decision tree and recorded in a computer file. In the case of the sequence of the drawings representing the master or ideal image, the decision tree is defined as a linear relationship progressing directly from the first frame to the last. In the case of the player/student controlled image, each frame is connected to a series of other frames representing the different ways in which the student can move the animated figure. The relationship between each interconnected image must be defined and stored. To make the definition of the decision tree easier, each part of the body which moves (such as an arm or leg) may be defined as a separate series of images.

Figure 15C:
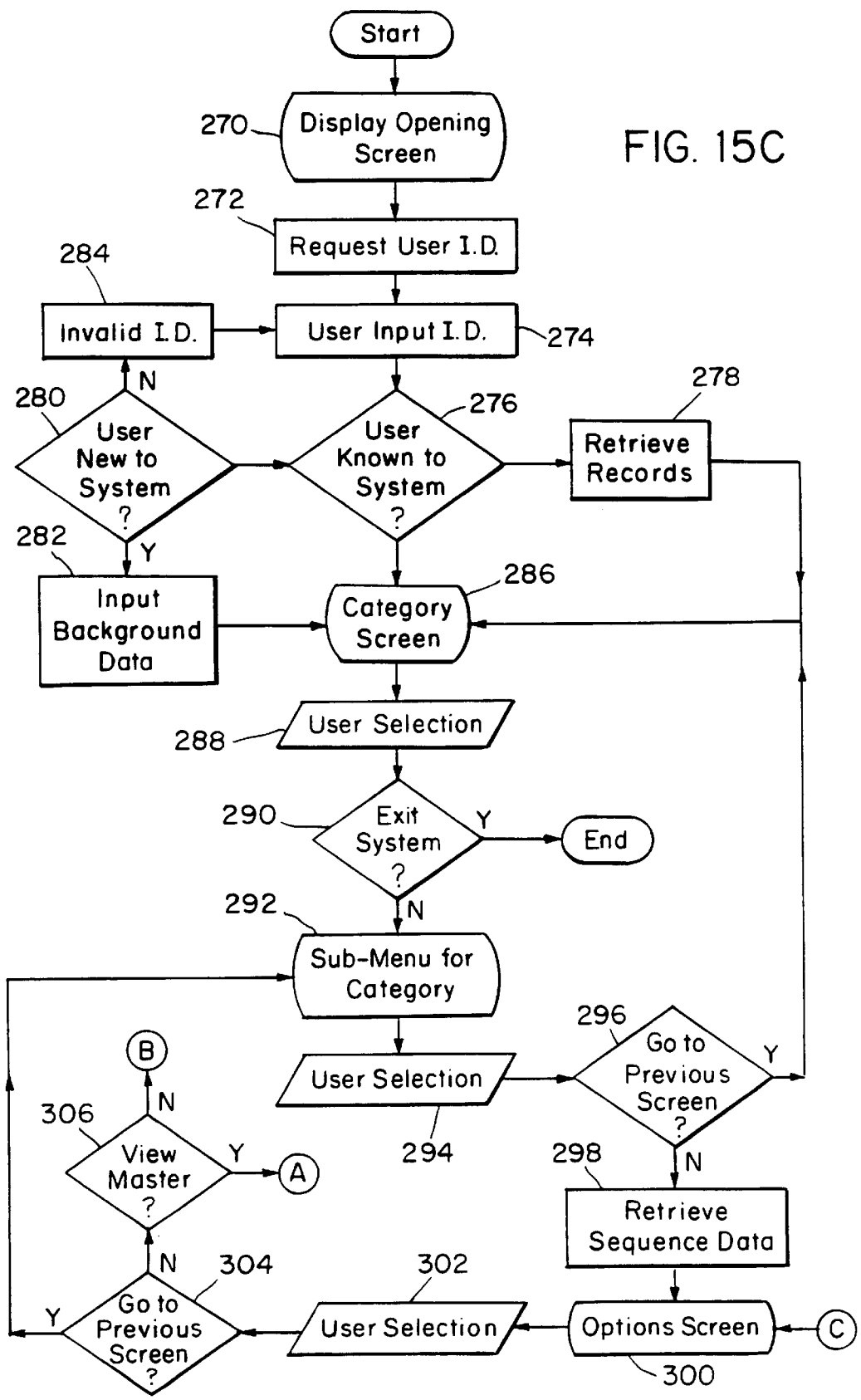
Figure 15D:
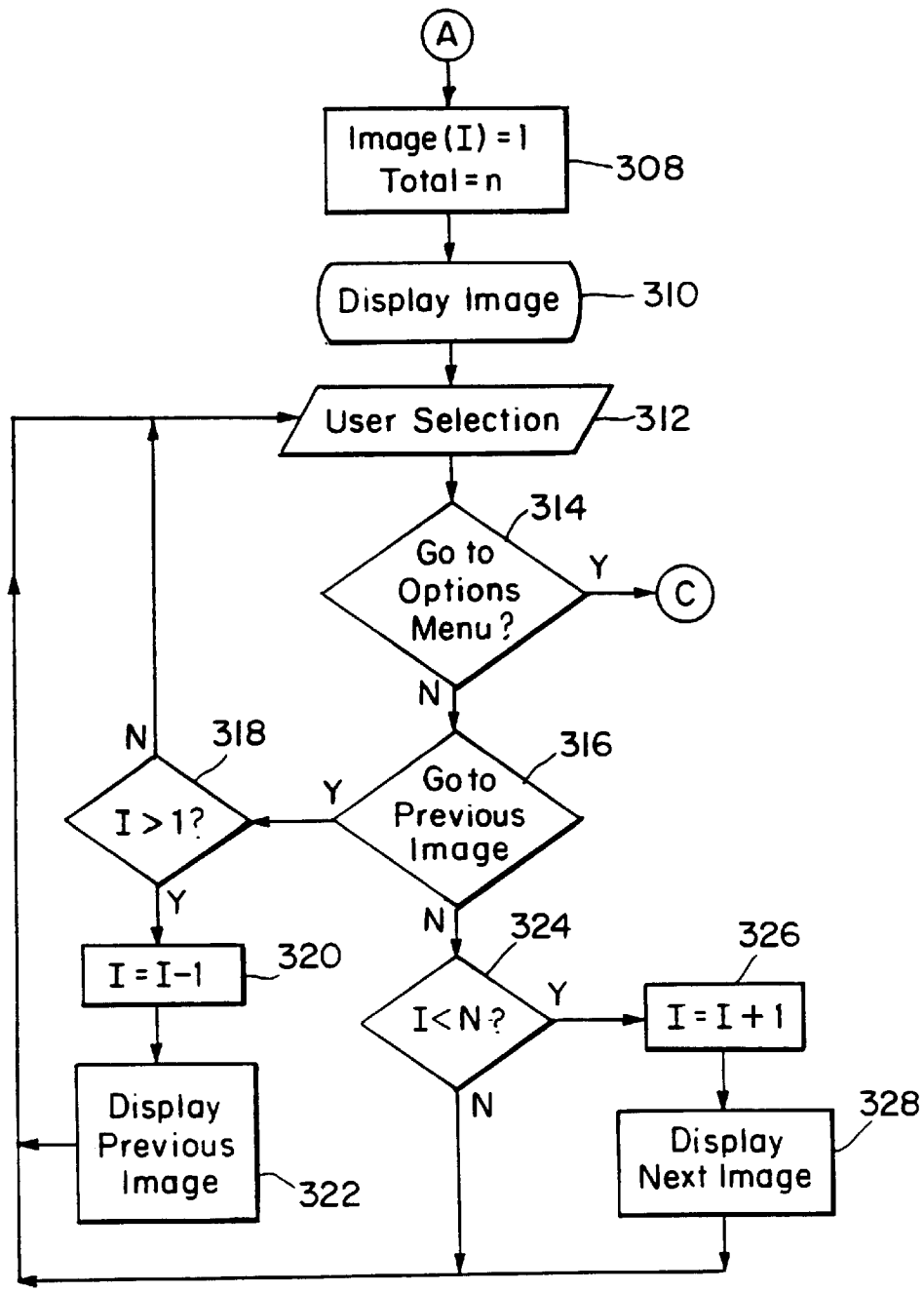
Figure 15E:
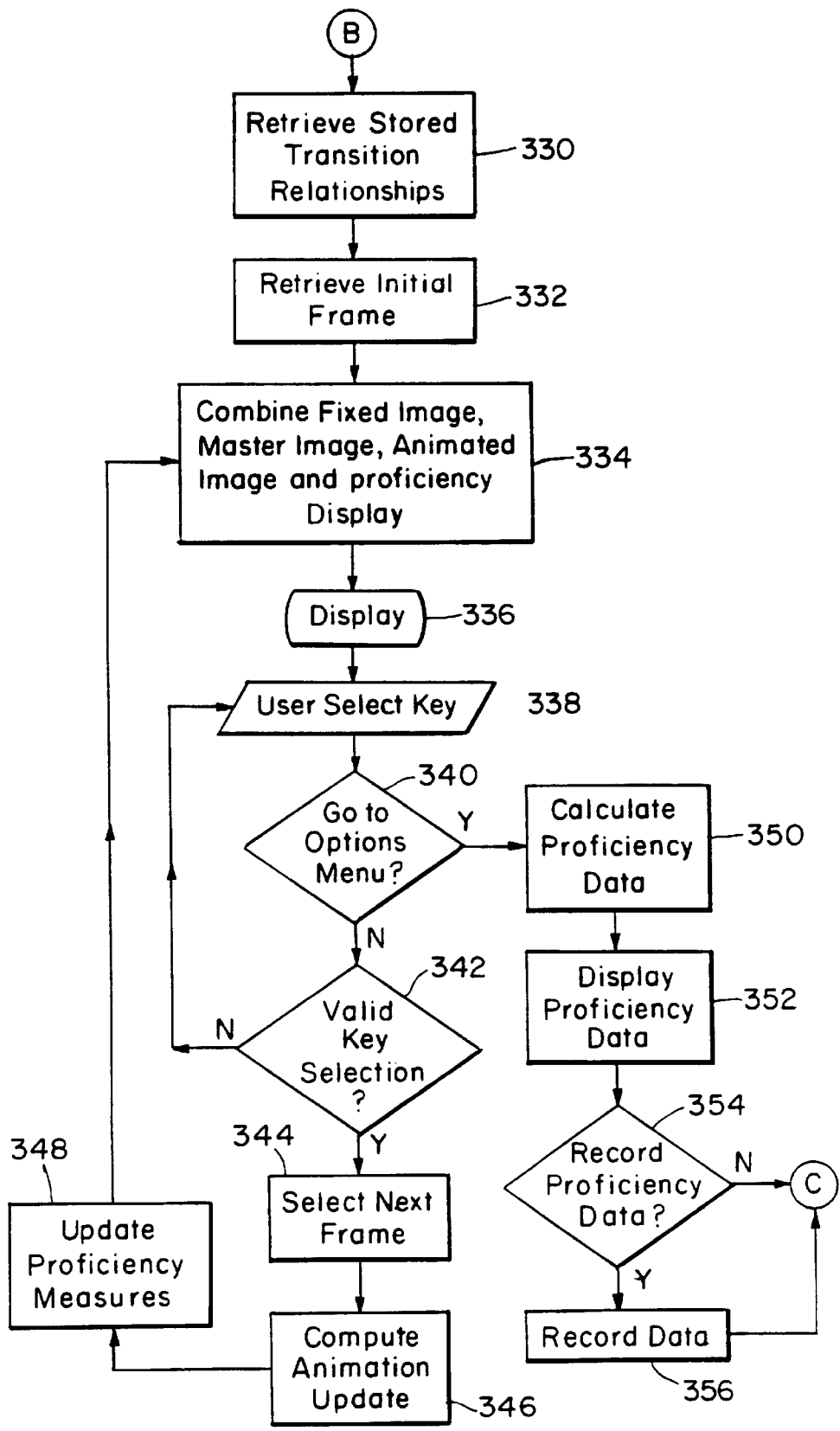

FIGS. 15C through 15E illustrate the logical flow of the system of the present invention which is run by the player/student or "user". In block 270 of FIG. 15C, the system displays an opening screen on the computer display which contains a title, logo, and welcome message. In block 272, the computer requests a user identification code (ID) and, in block 274, the player/student enters an ID into the computer via a keyboard, mouse or other user input device. In block 276, the system determines if the user has entered the system before. If the player/student has previously entered the system, information regarding his/her personal characteristics (e.g. name, identification code, weight, height, age, right or left handedness, level of expertise, team name, and coach/instructor's name) as well as his/her performance record will be retrieved from the database in block 278. If the player/student is new to the system, information regarding his/her personal characteristics will be recorded by the system in blocks 280 and 282. If the player/student has entered an invalid ID, the system will return to the input stage via block 284.

Following the identification process, the player/student is presented with, in block 286, a menu of general categories which describe the skills used in the sport of hockey, e.g., (1) skating,
(2) checking,
(3) stickhandling,
(4) shooting,
(5) offensive play, and
(6) defensive play.

In block 288, the player/student selects the number of the category he/she wishes to study and/or practice. If the player/student chooses to press <ESC>, he/she will exit the system in block 290.

For each general category, the computer system stores a list or sub-menu of specific plays or maneuvers which will develop the player/student's skills in the area selected. For example, under the category of skating, he/she may choose from the following options:

(1) dash-forward,
(2) dash-backward,
(3) start,
(4) stop,
(5) forward left crossover,
(6) forward right crossover,
(7) backward left crossover, and
(8) backward right crossover.

The sub-menu for the general category selected by the player/student is displayed in block 292, and the player/student selects the number of the maneuver he/she wishes to study and/or practice in block 294. If the user chooses to press <ESC>, he/she will return via block 296 to the category menu in block 286.

If the player/student opts to study a specific skill, the system retrieves the appropriate image sequences from the database in block 298. An options menu will be displayed in block 300. For each skill selected, the player/student can view the images of the ideal execution of the maneuver and/or interactively practice the skill by manipulating via the user input device an adopted image of a hockey player which has been superimposed over or juxtaposed to the ideal image on the display. When practicing a skill, the player/student attempts to manipulate the adopted player image to match as closely as possible the execution of the skill by the ideal image. The player/student makes this selection from the options menu in block 302. If the player/student chooses in block 302 to press <ESC>, he/she will return to the skill menu in block 292 via block 304. If the player/student chooses, in block 306, to view the master or ideal execution of the skill or maneuver, control of the system will pass to FIG. 15D. If the player/student chooses in block 306 to practice the selected skill or maneuver, control passes from block 306 to FIG. 15E.

Referring to FIG. 15D, if the player/student has chosen to view the master or ideal image, in blocks 308 and 310 the player/student begins with the first image in the sequence. If the player/student chooses in block 312 to press <ESC>, the system will return via block 314 to the options menu in block 300 (see FIG. 15C).

If the player/student chooses in block 316 to view the previous frame in the sequence, the system checks in block 318 to insure that a previous image exits, i.e., that the player/student is not currently viewing the first image in the sequence. If a previous frame exists, the system selects and displays the appropriate image in blocks 320 and 322.

If the player/student chooses in block 316 to view the next frame in the sequence, the system checks in block 324 to insure that a subsequent image exists, i.e., that the player/student is not currently viewing the last image in the sequence. If a subsequent frame exists, the system selects and displays the appropriate image in blocks 326 and 328.

Referring back to FIG. 15C, as mentioned above, if the player/student chooses in block 306 to practice the selected skill or maneuver, control passes to FIG. 15E. Referring to FIG. 15E, in block 330, the decision tree which describes the relationships between the drawings in the player/student controlled image sequence is retrieved. In block 332, the first image which will be displayed on the computer screen is determined. In blocks 334 and 336, the first image in the master sequence, the first image in the player/student controlled sequence, the fixed image (or background), and the proficiency display graphics are combined and displayed.

In block 338, the player/student may exit to the options menu via block 340 or select a computer key (or other input device, e.g. mouse, joystick) which will move the controlled image. If the player/student selects an invalid key, the system will give the player/student the option of selecting another key via block 342.

If the player/student selects a key to manipulate the controlled image, the next frame in the sequence will be selected in block 344. The controlled image will be updated in block 346 and proficiency measurements will be calculated in block 348. The system will then return to block 334 where the images will be combined and displayed.

While practicing the skill or maneuver, the player/student receives visual feedback by studying on the computer screen (monitor) how closely the adopted image emulates the ideal image. In addition, proficiency measurements are calculated and displayed on the computer screen together with the master and controlled images. The proficiency measurements can be continuously updated as the player/student proceeds through the practice session.

If the player/student chooses in block 340 to return to the options menu, the system will preferably calculate a numeric score or scores in block 350 which will represent how close the player/student came to emulating the ideal image. If applicable, the system will compare current results to those retrieved from the player/student's records. This will enable him/her to monitor his/her progress in perfecting the particular skill being studied. This information will be displayed on the computer screen in block 352.

If the player/student chooses in block 354 to count the practice session as a "warm-up", the current score will not be recorded in the player/student's Record. Otherwise, the player/student's current performance will be recorded in block 356 by the computer for future reference. Control of the system then returns to FIG. 15C.

In a further embodiment of the invention, the player/student has the option of controlling the adopted image of one or more hockey players against an image of an opposing team in the context of a hockey game. The opposing team can include one to five ideal players (plus one goaltender) that are controlled by the computer system.

The player/student can select the number of players (one to six including goaltender) on the opposing team from a menu screen. In addition, the player/student has the option of choosing whether the opposing team is in an offensive or defensive posture.

The player/student can then choose from a list of attacking or defending formations for the opposing team. The list of formations varies with the number of players on the opposing team; a full team of six (5 skaters and one goalie) will offer the maximum number of formations.

The simulated game can be played with the player/student causing the movement of the adopted player image(s) to "play" against the ideal team which is pre-controlled by the computer software. The rules of the game are those generally used in competitive hockey, i.e., by most American, Canadian, and international teams. Games usually last from 10 to 45 minutes depending on the delivery system being used, e.g., tutorial/interactive, coaching, arcade, home, etc.

Additional embodiments of the invention enable the player/student to play against an opposing team when his/her adopted image is part of an adopted team. The team may include ideal computer controlled images or adopted images controlled by other player/students on additional terminals connected to the system. Each team can include one to five players (plus goalies), with fewer players for roller hockey.

An additional embodiment of the invention enables officials (referees, linesmen, and other officials) in the sport of ice hockey or in other sports or activities to practice making decisions regarding infractions of the rules while watching and controlling digitized images on a computer screen. The digitized images include preselected plays or maneuvers executed by a single player against one or more opponents or by a player in combination with one or more of his/her teammates playing against an opposing team including one or more players.

The officials view the execution of the play, while moving an "adopted" official, in digital form, to the best vantage point from which to see the plays, and decide whether the actions of the player or players or coaches are within the rules of the game or constitute an infraction for which a penalty must be served. The invention enables the officials to record their decisions in the computer system.

The digitized images can be obtained from video tapes of live athletes playing ice hockey or from digitized representations of players. Appropriate sections of the video tape or digitized representation can be selected and converted to or maintained in digitized format. The selected images can be viewable on a computer screen. Officials are able to speed up or slow down the images as they appear on the screen. Alternatively, the speed of on-screen action can be controlled by persons responsible for assessing the officials' performance. Officials can be required to move their adopted on-screen official image so as to be in the best position to see the play and make a call when warranted. Reverse angle views of the digitized images can be available on demand to provide real time feedback on whether a play included a foul or was cleanly executed.

After viewing each specific image sequence, the official can enter into the computer his/her decisions regarding the legitimacy of the plays previously observed. The results are compiled by the computer and fed back to the officials via the computer screen or by hardcopy printouts.

The benefits of this embodiment include the opportunity for officials to practice decision making at their own pace in a relaxed environment. As with the previous embodiments of this invention, the images on the computer screen may be viewed frame by frame, or at any speed from slow motion to real time to super real time, and repeated as many times as desired. This will enable officials to study details which may be missed in the fast, high pressure setting of a hockey game or to test their skills in making calls at real time rates of speed or even faster (super) than actual playing speed. As the officials progress in their decision-making abilities, the images which are viewed at increasingly faster speeds, either real-time or faster, provide practice in quick orientation, observation and judgment and thereby sharpen officiating skills.

After each image sequence has been viewed, the official can use means such as a computer keyboard, mouse, joystick or other input device to input his/her decision regarding the legitimacy of the observed plays into the computer system. The official is presented with a list of possible infractions and asked to select those infractions observed during the image sequence. The official gains points for correct judgments and lose points for incorrect judgments. At the end of the exercise, the computer can display a numeric score as well as a list of incorrect decisions. The score and list may also be printed in hardcopy format if desired.

If the user does not achieve a certain level of proficiency, the official can be required to loop back and repeat testing on the image sequences previously viewed before advancing to a higher level. As with previous embodiments of the invention, the computer can keep a record of the proficiency scores for each official. Current scores may be compared to those attained previously. This will enable each user to monitor his/her progress in perfecting his/her decision-making skills.

The purpose of this embodiment is to accelerate the experience and improve the judgment skills of officials in ice hockey by increasing the number of decisions made while observing actual hockey plays and maneuvers. Officials will obtain practice in orientation, observation and judgment. Consistency and objectivity will be increased. The rules of the game will be reenforced in the minds of the officials. In addition, use of this embodiment of the invention may also help students and players of ice hockey to learn the rules and regulations of the game.

The foregoing describes the use of the system of the present invention for cognitive instruction, training and practice in the sport of ice hockey. However, as will be recognized by those of ordinary skill in the art, the system of the present invention may be utilized for other sports or athletic training, including, but not limited to, street hockey, roller hockey, field hockey, figure skating, soccer, football, baseball, etc., or instruction in other non-sport activities. For example, the system of the present invention may be utilized in an instructional program for soccer by storing images of ideal soccer plays and allowing the player/student to control an image of a soccer player in the manner described previously for ice hockey.

It will also be apparent to those skilled in the art that the scope of the present invention need not be limited to the technology described above. For example, the method used by the player/student to manipu ate the "controlled" image may be changed to include a joystick, virtual reality glove or other technology and the "adopted" and "ideal" images may appear on a virtual reality headset or other virtual reality device(s). The method of obtaining, storing, and displaying the "controlled" and "ideal" images may also be changed to include video, multi-media, or animation methods.

While this invention has been particularly shown and described with references to preferred embodiments thereof, it will be understood by those skilled in the art that various changes in form and details may be made therein without departing from the spirit and scope of the invention as defined by the appended claims.

The invention claimed is:

1. A method of instructing in simulated training, using a processing system, for at least two groups of users to interactively control at least two groups of user controllable images to perform personal, idiosyncratic, interactive, simulated physical activity movements displayed by said processing system, said method comprising the steps of:

generating, storing, and maintaining, in a memory means of said processing system, at least two groups of user controllable images, wherein at least one group of user controllable images is controlled by one of said at least two groups of users to perform a sequence of said movements and at least another group of user controllable images controlled by another one of said at least two groups of users to perform a sequence of said movements;

displaying each one of said groups of user controllable images to each respective one of said at least two groups of users;

receiving inputs from each respective one of said at least two groups of users to control each respective one of said groups of user controllable images;

providing each respective one of said at least two groups of users with input means to said processing system such that said each respective one of said groups of user controllable images perform said movements by inputs from said each respective one of said at least two groups of users without requiring said each respective one of said at least two groups of uses to perform the same or any related physical movements;

recording and maintaining, in said memory means, a record of said each respective one of said groups of user controllable images movements such that said record is modified to represent said idiosyncratic movements as controlled by said input means; and retrieving outputs of said each respective one of said groups of user controllable images movements from said memory means and displaying said outputs by display means of said processing system.

2. The method of claim 1, further comprising the step of accepting inputs from said each respective one of said at least two groups of users to select characteristic parameters of said each respective one of said groups of user controllable images.

3. The method of claim 1, further comprising wherein the step of accepting inputs from said each respective one of said at least two groups of users to select at least one of the speed, direction, posture, orientation, with respect to any axis, position, locomotion, maneuver and coordination of said each respective one of said groups of user controllable images relative to other of said each respective one of said groups of user controllable images.

4. The method of claim 1, wherein at least two users of said each respective one of said at least two groups of users control at least two of said each respective one of said groups of user controllable images to perform said movements in at least one of physical activities comprising competition, opposition, synchronization, coordination, sport, and combat.

5. The method of claim 1, further comprising the step of measuring said user controlled movements of said each respective one of said groups of user controllable images with respect to a pre-programmed model of effective movements of said each respective one of said group of user controllable images.

6. The method of claim 5 wherein at least two users of one of said at least two groups of users control at least two of said each respective one of said groups of user controllable images so that the movements of said at least two of said each respective one of said groups of user controllable images indicate achievement by said at least two users of said one of said at least two groups of users in controlling said at least two of said each respective one of said groups of user controllable images.

7. The method of claim 5 further comprising the step of evaluating the relative effectiveness of movements between said at least two users of one of said at least two groups of users and at least two users of another one of said at least two groups of users controlling said each respective one of said groups of user controllable images in simulated physical movements of said at least one of competition, opposition, synchronization, coordination, sport, and combat.

* * * * *